(12) United States Patent
Abrari et al.

(10) Patent No.: US 7,020,869 B2
(45) Date of Patent: Mar. 28, 2006

(54) BUSINESS RULES USER INTERFACE FOR DEVELOPMENT OF ADAPTABLE ENTERPRISE APPLICATIONS

(75) Inventors: Pedram Abrari, Redwood City, CA (US); Mark J. F. Allen, Menlo Park, CA (US)

(73) Assignee: Corticon Technologies, Inc., San Mateo, CA (US)

( * ) Notice: Subject to any disclaimer, the term of this patent is extended or adjusted under 35 U.S.C. 154(b) by 747 days.

(21) Appl. No.: 09/994,477

(22) Filed: Nov. 26, 2001

(65) Prior Publication Data

US 2002/0120917 A1    Aug. 29, 2002

Related U.S. Application Data

(60) Provisional application No. 60/250,869, filed on Dec. 1, 2000.

(51) Int. Cl.
*G06F 9/44* (2006.01)

(52) U.S. Cl. .................. 717/108; 717/116; 706/47

(58) Field of Classification Search ............... 717/102, 717/108, 116; 706/47
See application file for complete search history.

(56) References Cited

U.S. PATENT DOCUMENTS

| | | | | |
|---|---|---|---|---|
| 5,418,957 A | * | 5/1995 | Narayan | 717/113 |
| 5,668,978 A | * | 9/1997 | Yasutake et al. | 703/26 |
| 5,745,901 A | * | 4/1998 | Entner et al. | 707/103 R |
| 5,754,857 A | * | 5/1998 | Gadol | 709/203 |
| 5,870,719 A | * | 2/1999 | Maritzen et al. | 705/26 |
| 5,875,330 A | * | 2/1999 | Goti | 717/104 |
| 5,886,693 A | * | 3/1999 | Ho et al. | 715/700 |
| 5,915,115 A | * | 6/1999 | Talati | 717/155 |
| 5,918,210 A | * | 6/1999 | Rosenthal et al. | 705/7 |
| 6,016,477 A | * | 1/2000 | Ehnebuske et al. | 705/7 |
| 6,041,213 A | * | 3/2000 | Yanagi | 399/401 |
| 6,041,312 A | * | 3/2000 | Bickerton et al. | 705/30 |
| 6,067,531 A | * | 5/2000 | Hoyt et al. | 705/35 |
| 6,115,686 A | * | 9/2000 | Chung et al. | 704/260 |
| 6,148,290 A | * | 11/2000 | Dan et al. | 705/1 |
| 6,199,047 B1 | * | 3/2001 | Dimino et al. | 705/10 |
| 6,249,905 B1 | * | 6/2001 | Yoshida et al. | 717/100 |
| 6,272,482 B1 | * | 8/2001 | McKee et al. | 706/47 |
| 6,275,848 B1 | * | 8/2001 | Arnold | 709/206 |
| 6,314,415 B1 | * | 11/2001 | Mukherjee | 706/47 |
| 6,330,711 B1 | * | 12/2001 | Knutson | 717/100 |
| 6,341,369 B1 | * | 1/2002 | Degenaro et al. | 717/117 |
| 6,389,588 B1 | * | 5/2002 | Wadhwa et al. | 717/106 |
| 6,453,356 B1 | * | 9/2002 | Sheard et al. | 709/231 |
| 6,456,986 B1 | * | 9/2002 | Boardman et al. | 705/400 |

(Continued)

OTHER PUBLICATIONS

Getting Results with the Object-Oriented Enterprise Model, Thornton Gale et al, Jan. 29, 1996, pp. 135-161.*

(Continued)

*Primary Examiner*—Todd Ingberg
(74) *Attorney, Agent, or Firm*—Fish & Richardson P.C.

(57) ABSTRACT

Methods and apparatus, including computer program products, for interacting with a user to define business rules in a declarative manner. The invention operates to display a rule set as an editable list of conditions and an editable list of actions, the conditions and actions being linked to each other by the combination of an editable list of if-values and an editable list of then-values, wherein if-values and then-values are explicitly linked to each other, conditions and if-values are explicitly linked to each other, and then-values and actions are explicitly linked to each other in the displayed lists.

49 Claims, 13 Drawing Sheets

*1204*

| Rules | | | | | | | | | |
|---|---|---|---|---|---|---|---|---|---|
| | Conditions | Values | A | B | C | D | E | F | G |
| 1 | rating | { 'A' , 'BBB' , 'BB' } | 'A' | - | { 'BBB' , 'BB' } | | | | |
| 2 | yield | { >= 7, < 7 } | - | >= 7 | < 7 | | | | |
| 3 | | | | | | | | | |

| | Actions | Values | A | B | C | D | E | F | G |
|---|---|---|---|---|---|---|---|---|---|
| 1 | dProfile | {'HI-GRD', 'HI-YLD', 'DOG'} | 'HI-GRD' | 'HI-YLD' | 'DOG' | | | | |
| | | Overrides | 2 | | | | | | |

| Rule Statements | |
|---|---|
| 1 | A security with a rating equal to A is considered HIGH GRADE. |
| 2 | A security with a yield greater than or equal to 7 percent is considered HIGH YIELD. |
| 3 | A security with a rating lower than1 anba yield liwer than 7is a Dog |

| ED_SecurityPosition | ED_Account | ED_SecurityProfile | ED_Security |
|---|---|---|---|

U.S. PATENT DOCUMENTS

| | | | |
|---|---|---|---|
| 6,473,748 B1 * | 10/2002 | Archer | 706/45 |
| 6,484,149 B1 * | 11/2002 | Jammes et al. | 705/26 |
| 6,487,566 B1 * | 11/2002 | Sundaresan | 715/513 |
| 6,523,027 B1 * | 2/2003 | Underwood | 707/4 |
| 6,532,465 B1 * | 3/2003 | Hartley et al. | 707/10 |
| 6,601,233 B1 * | 7/2003 | Underwood | 717/102 |
| 6,609,128 B1 * | 8/2003 | Underwood | 707/10 |
| 6,620,204 B1 * | 9/2003 | Malcolm | 715/513 |
| 6,633,878 B1 * | 10/2003 | Underwood | 707/100 |
| 6,662,164 B1 * | 12/2003 | Koppelman et al. | 705/14 |
| 6,714,928 B1 * | 3/2004 | Calow | 707/4 |
| 6,718,535 B1 * | 4/2004 | Underwood | 717/101 |
| 6,744,761 B1 * | 6/2004 | Neumann et al. | 370/389 |
| 6,745,381 B1 * | 6/2004 | Ehnebuske et al. | 717/100 |
| 6,745,382 B1 * | 6/2004 | Zothner | 717/107 |
| 6,751,657 B1 * | 6/2004 | Zothner | 709/220 |
| 6,754,886 B1 * | 6/2004 | Merk et al. | 717/116 |
| 6,775,658 B1 * | 8/2004 | Zothner | 706/47 |
| 6,789,252 B1 * | 9/2004 | Burke et al. | 717/100 |
| 6,810,429 B1 * | 10/2004 | Walsh et al. | 709/246 |
| 6,850,922 B1 * | 2/2005 | Wason | 706/47 |
| 6,851,105 B1 * | 2/2005 | Coad et al. | 717/106 |
| 6,853,994 B1 * | 2/2005 | Gupta | 707/6 |
| 6,898,783 B1 * | 5/2005 | Gupta et al. | 717/105 |

OTHER PUBLICATIONS

Visual Modeling Technique Object Technology Using Visual Programming, Daniel Tkach et al, 1996, pp. 324-336.*

Object Development Methods, Andy Carmichael, Jan. 10, 1994, pp. 199-210.*

Principles of Object-Oriented Analysis and Design, James Martin, Oct. 29, 1992, pp. 133-154.*

Workflow Template Process Developing a WFT Workflow System, Template Software, WFT Version 8.0, Second Edition, Whole Manual, 1998.*

Workflow Template Process Using a WFT Development Environment, Template Software, WFT Version 8.0, Second Edition, Whole Manual, 1998.*

Expert Workflow Building Knowledge-Based Workflow Systems with Object Technology, Sven Erik Johansson et al, ACM, 1997, pp. 45-49.*

Extending Workflow Management Systems By A Dialogical Component, H. Wedekind, ACM, Feb. 1996, pp. 150-157.*

Visual Object-Oriented Programming Concepts and Environmnets, Margaret M. Burnett et al, 1994, p. 132-159.*

Workflow Imperative Building Real World Business Solutions, Thomas M. Koulopoulos et al, Mar. 27, 1995, pp. 150-179.*

The UML Rules, Radmilla Juric, ACM Sigsoft, Jan. 1998, pp. 92-97.*

Use Case and Business Rules Style of Documenting Business Rules in Use Cases, Ed Anderson et al, ACM Jan. 1997, pp. 85-87.*

WIDE Workflow Development Methodology, L. Baresi et al, ACM, Mar. 1999, pp. 19-28.*

UML:The Language of Blueprints for Software, Derek Coleman et al, ACM, Oct. 1997, pp. 201-205.*

Modeling Web Applications Architectures with UML, Jim Conalen, ACM, Oct. 1999, pp. 63-69.*

Using UML for Software Process Modeling, Dirk Jager et al, ACM, Oct. 1999, pp. 91-108.*

SNAP Foundation Template Using the SNAP Development Environment, Template Software, Chapter 1-7, 1997.*

Keith A. Butler, "Designing Deeper: Towards a User-Centered Development Environment", Research & Technology Boeing Information & Support Systems, ACM-0-89791-673, 131-142 (1995).

Dursun Delen, et al., "An Integrated Toolkit For Enterprise Modleing and Analysis", Proceedings of the 1999 Winter Simulation Conference, pp. 289-297 (1999).

Katherine A. Jones, "An Introduction to Data Warehousing: What Are the Implications for the Network", *International Journal of Network Management*, 8:42-56 (1998).

P. Lang, et al., "Modeling Business Rules with Situation/Activation Diagrams", *IEEE*, 14$^{th}$ International Conference, pp. 42-56 (1997).

Stanley Y. W. Su, et al., "An Extensible Knowledge Base Management System for supporting Rule-based Interoperability among Heterogeneous Systems," Database Systems Research and Development Center, University of Florida, (1995).

* cited by examiner

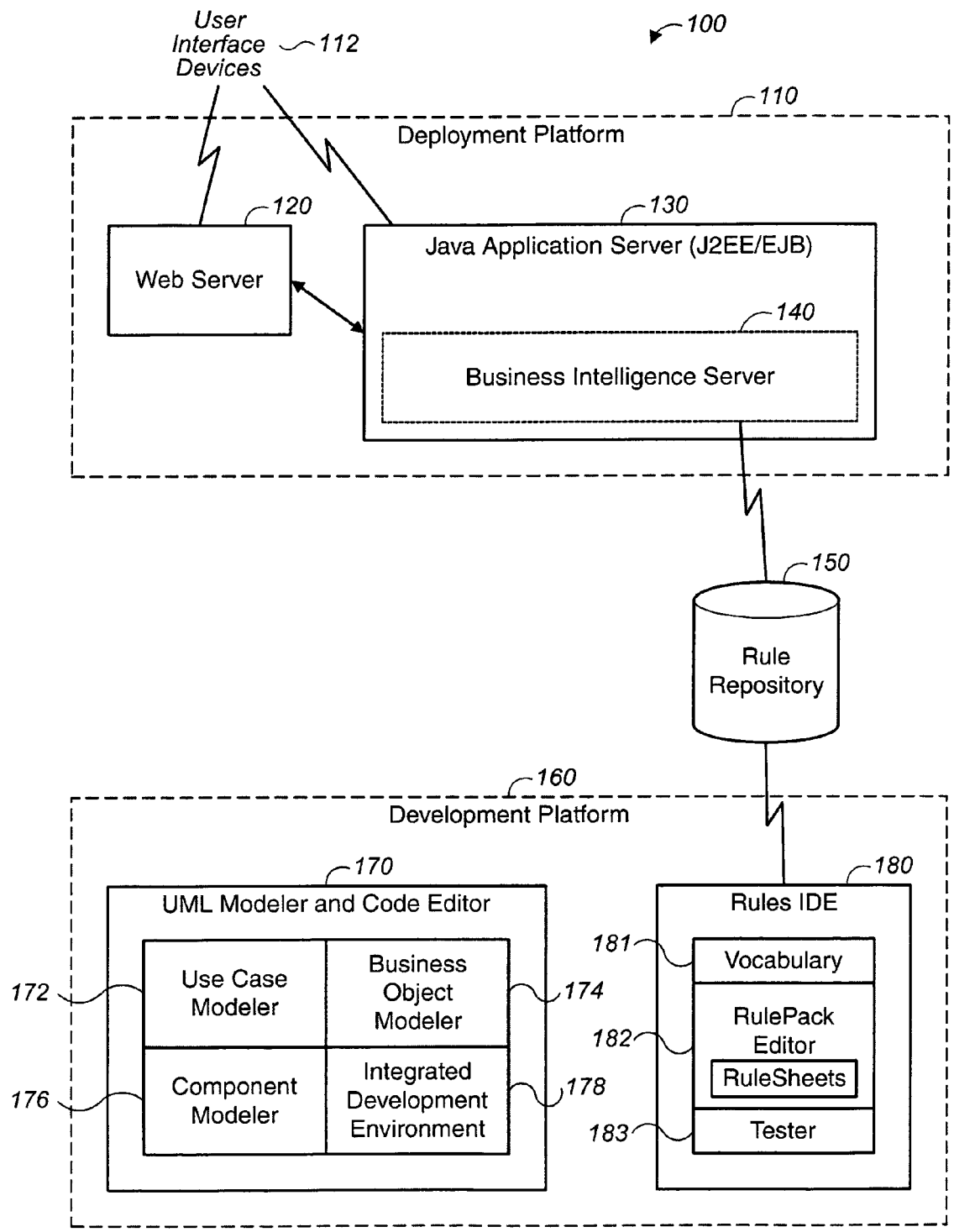
FIG._1

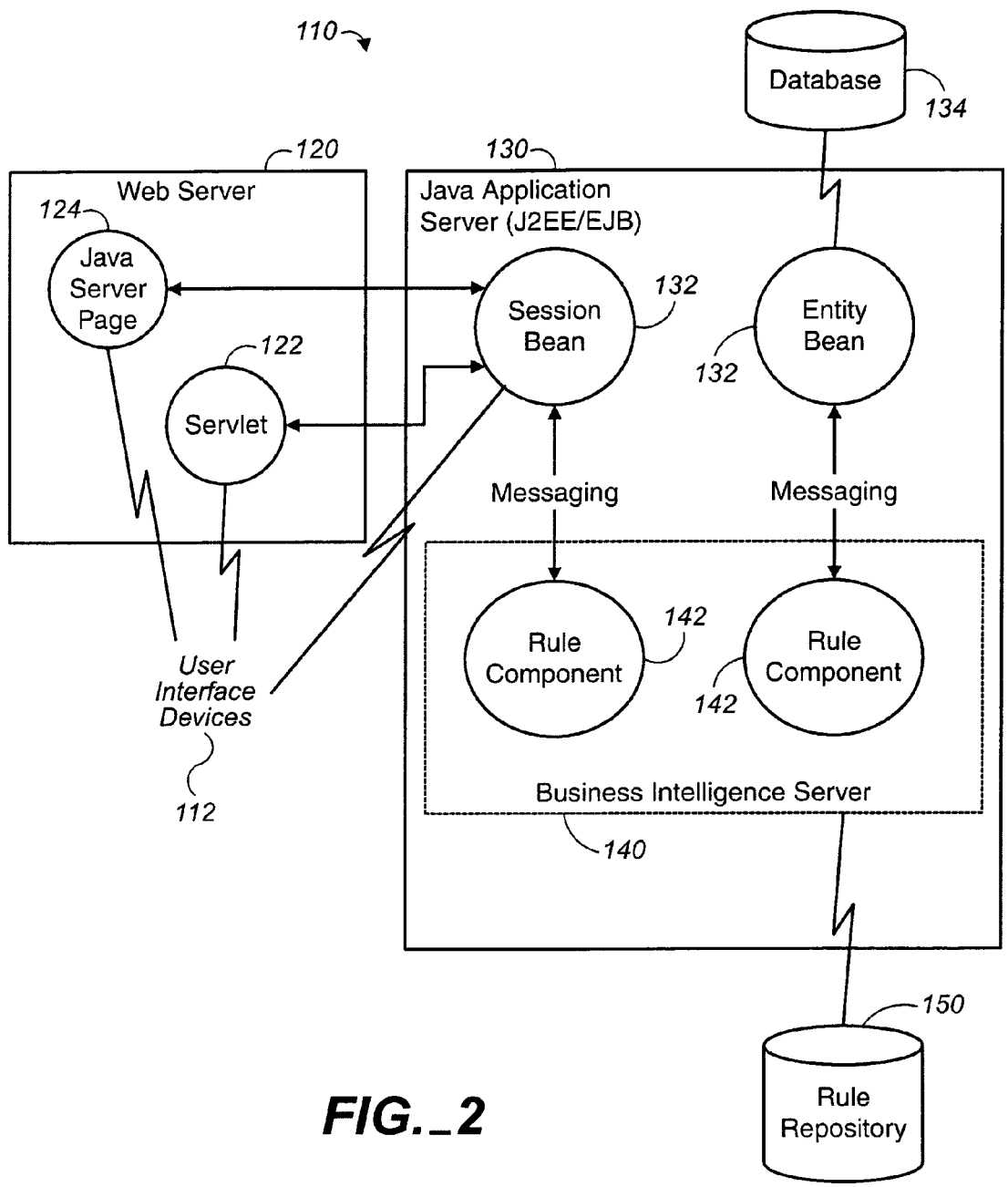
FIG._2

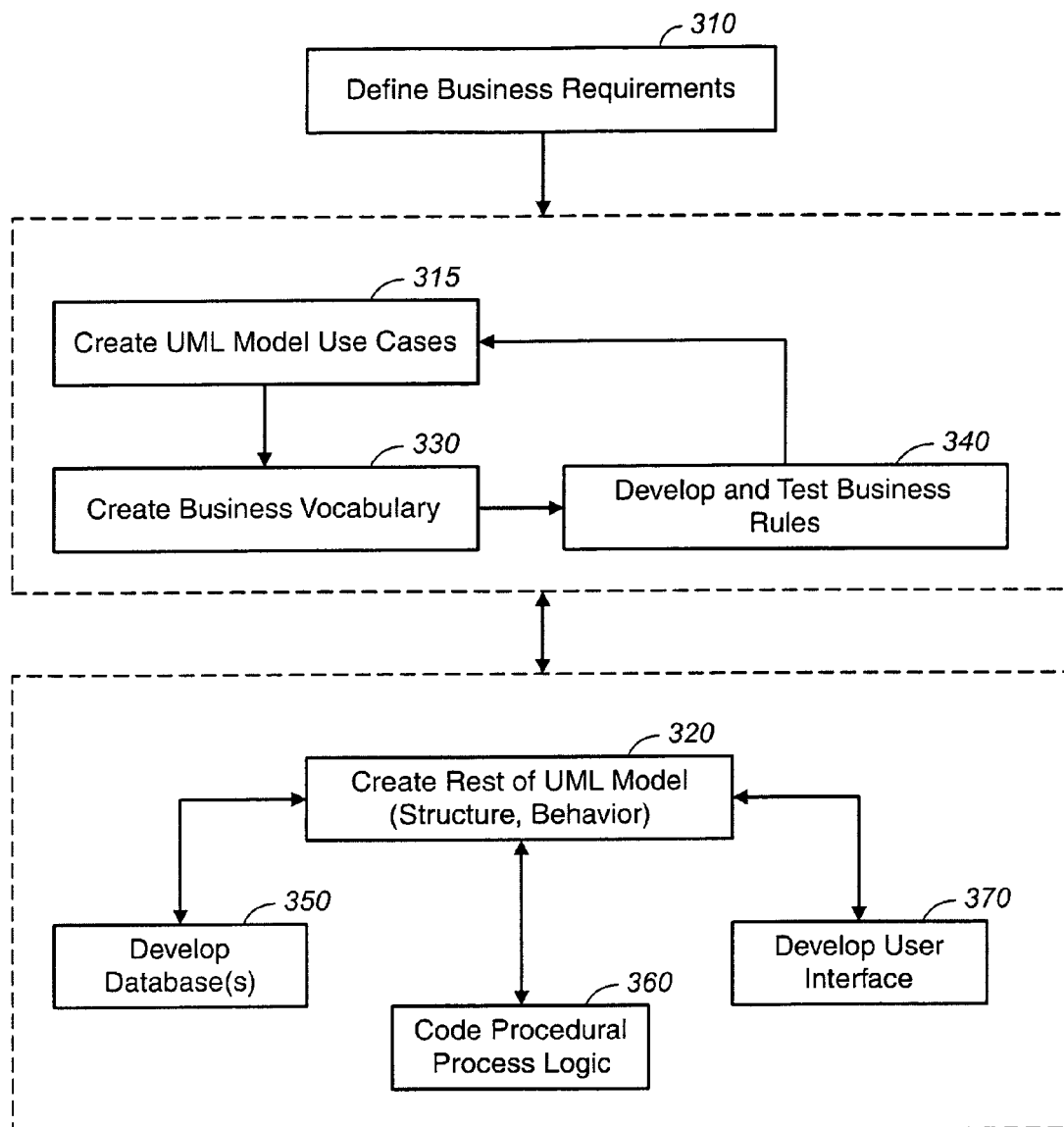
FIG._3

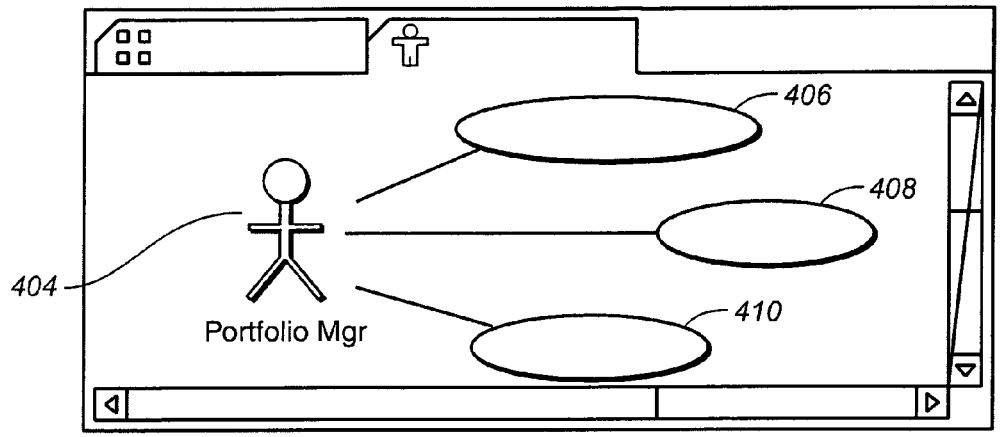
FIG._4
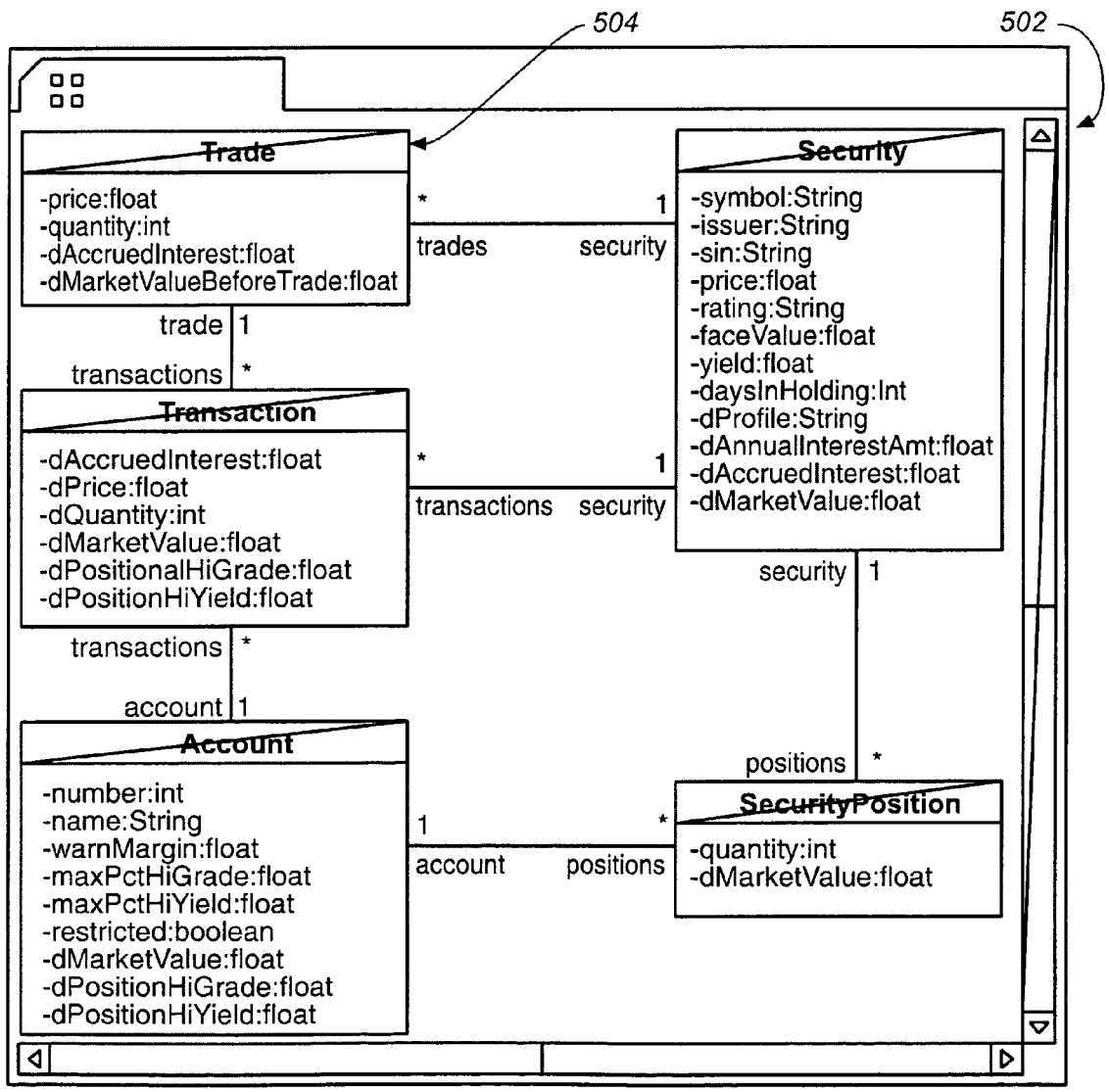
FIG._5

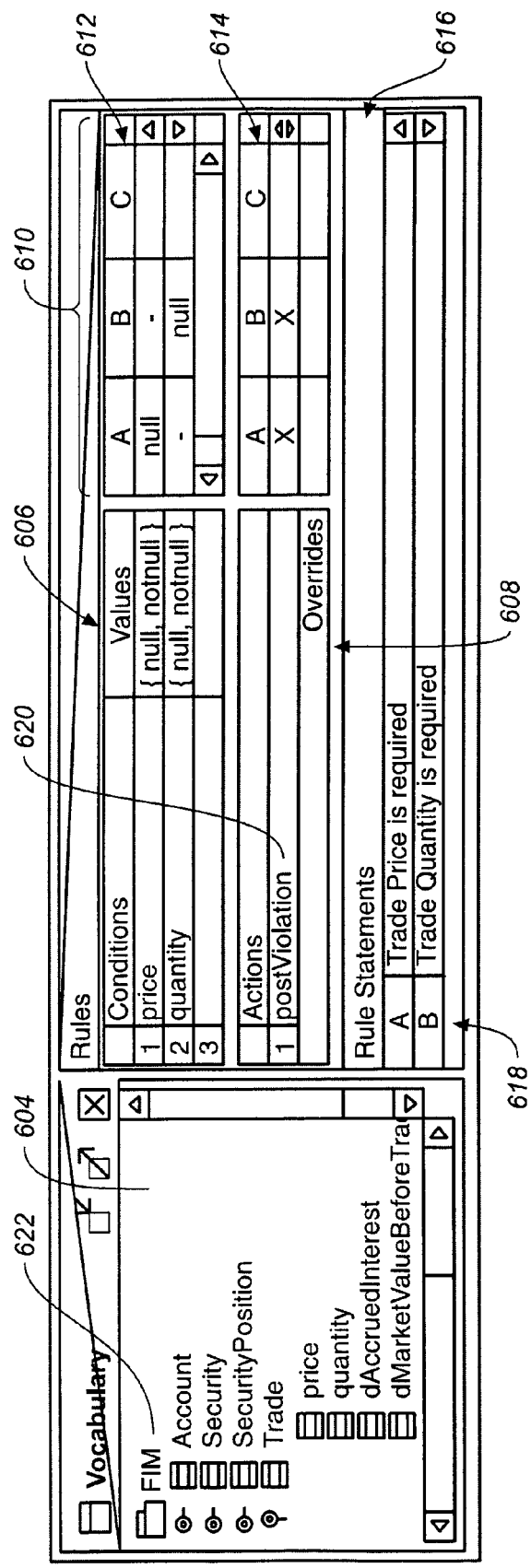
FIG._6

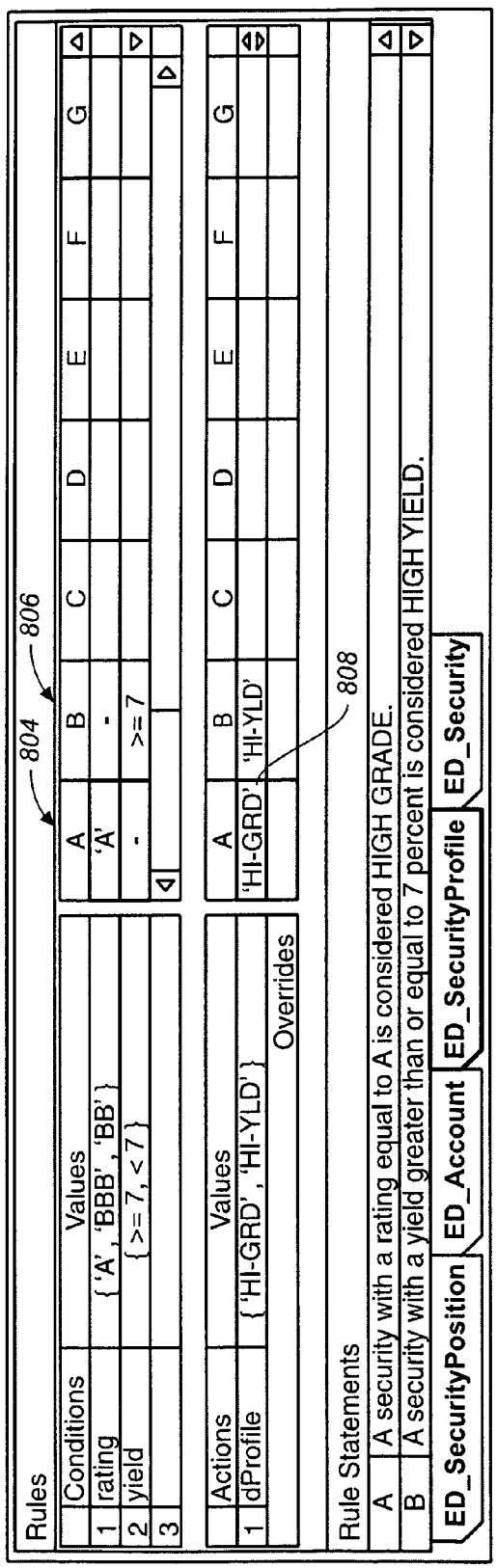
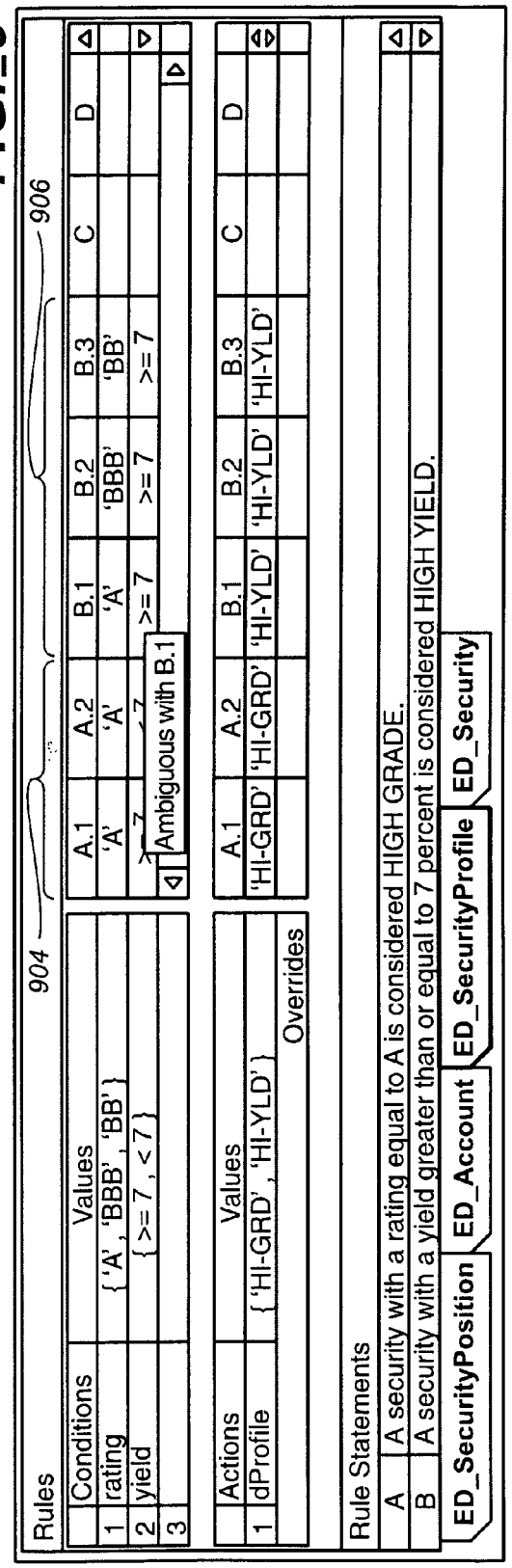
FIG._8
FIG._9

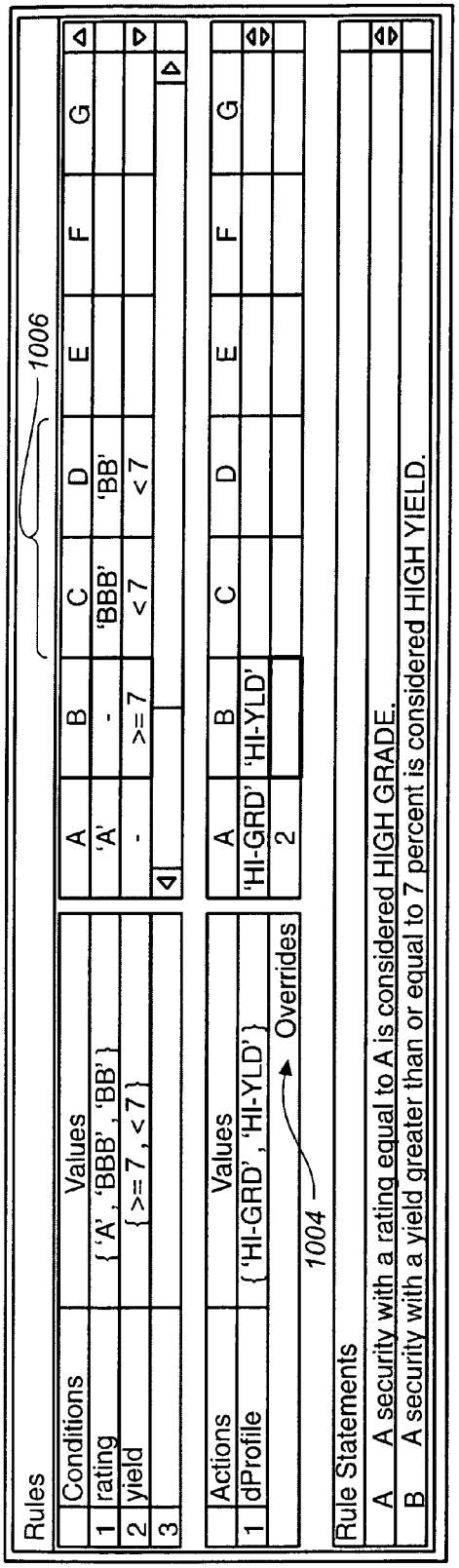
FIG._10
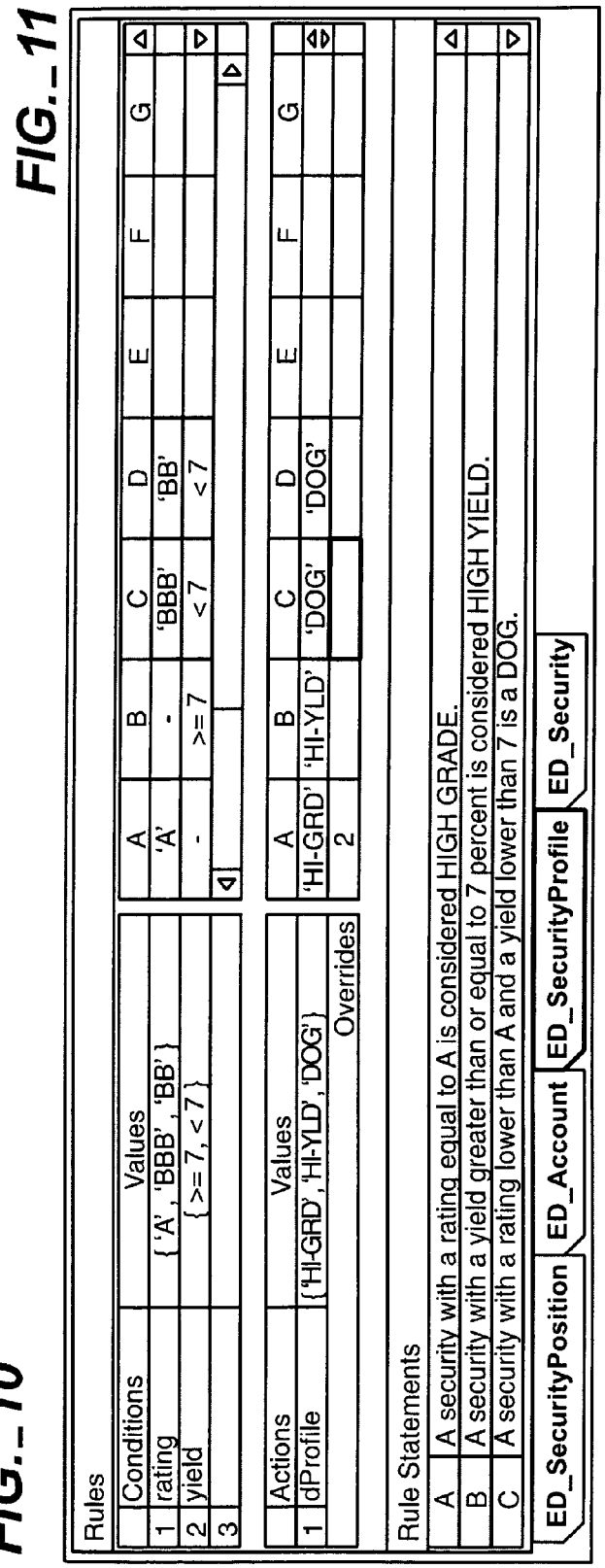
FIG._11

| Rules | | |
|---|---|---|
| | Conditions | Values |
| 1 | rating | {'A', 'BBB', 'BB'} |
| 2 | yield | {>=7, <7} |
| 3 | | |

| | | | A | B | C | D | E | F | G | |
|---|---|---|---|---|---|---|---|---|---|---|
| | | | 'A' | - | {'BBB', 'BB'} | | | | | ◁ |
| | | | - | >=7 | <7 | | | | | ▷ |
| | | | ◁ | | | | | | | △ |

1204

| Actions | | |
|---|---|---|
| | | Values |
| 1 | dProfile | {'HI-GRD', 'HI-YLD', 'DOG'} |

| | | | A | B | C | D | E | F | G | |
|---|---|---|---|---|---|---|---|---|---|---|
| | | | 'HI-GRD' | 'HI-YLD' | 'DOG' | | | | | ◁▷ |
| Overrides | | | 2 | | | | | | | |

| Rule Statements | |
|---|---|
| 1 | A security with a rating equal to A is considered HIGH GRADE. |
| 2 | A security with a yield greater than or equal to 7 percent is considered HIGH YIELD. |
| 3 | A security with a rating lower than1 anba yield liwer than 7is a Dog |

ED_SecurityPosition | ED_Account | ED_SecurityProfile | ED_Security

FIG._12

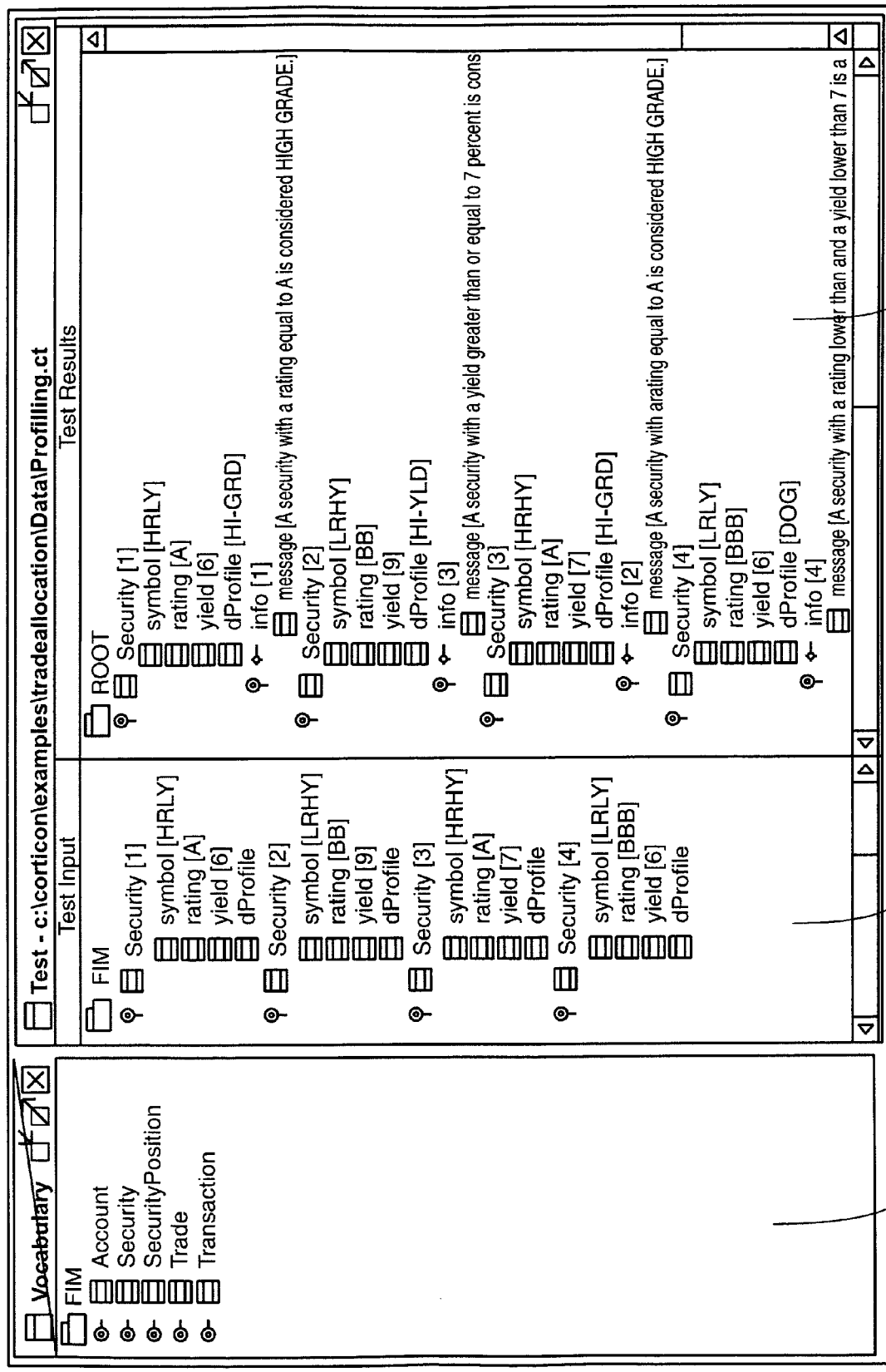
FIG._13

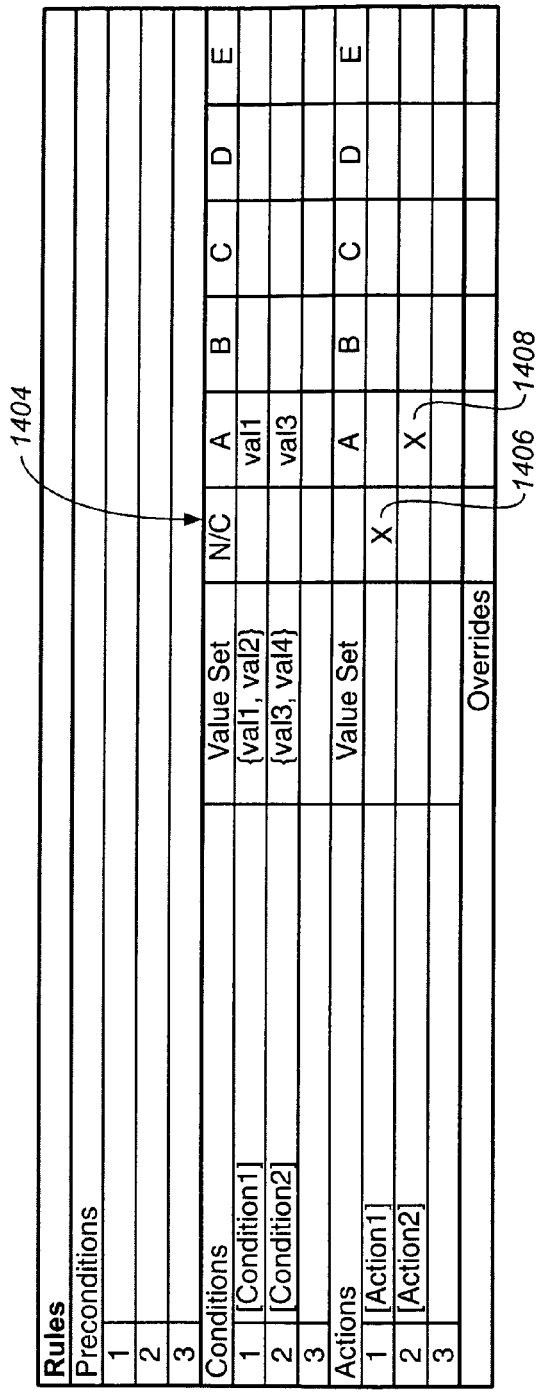
FIG._14
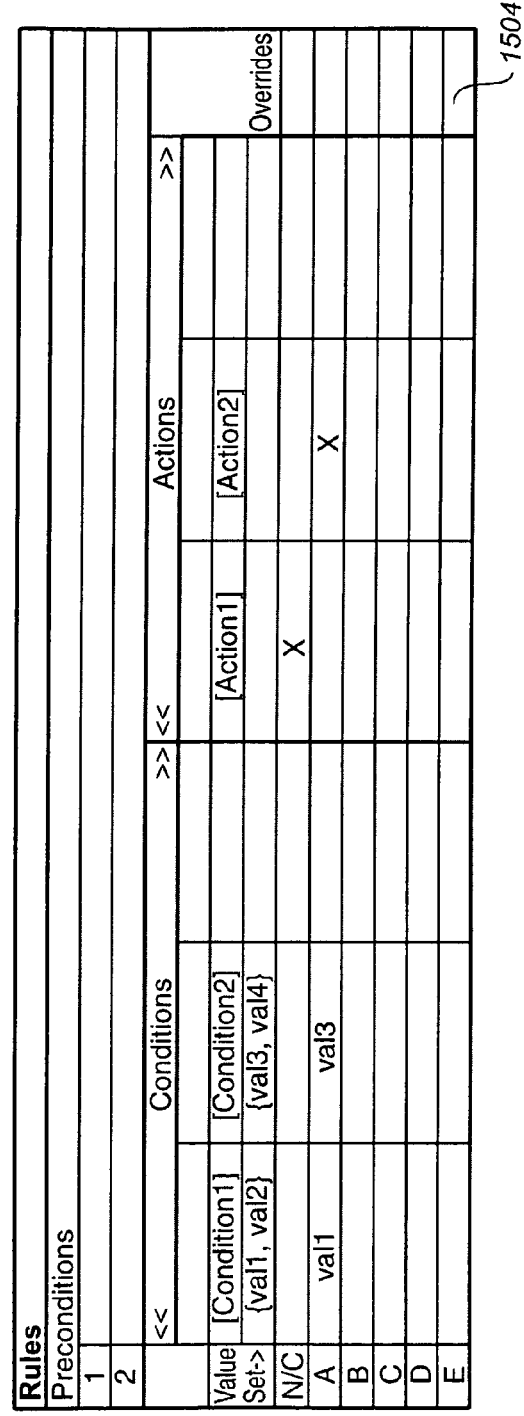
FIG._15

FIG._16

| Rules | | | | | | | |
|---|---|---|---|---|---|---|---|
| Preconditions | | | | | | | |
| 1 | | | | | | | |
| 2 | | | | | | | |
| Conditions | | Value Set | N/C | A | B | C | D | E | F |
| 1 | | | | | | | | | |
| 2 | | | | | | | | | |
| 3 | | | | | | | | | |
| Actions | | Value Set | | A | B | C | D | E | F |
| 1 | | | | X | | X | | | |
| 2 | | | | X | X | | | | |
| 3 | | | | | | | | | |

↙1610  ↙1612  ↙1614

| Overrides | Dominant Rule | >> | Recessive Rule |
|---|---|---|---|
| 1 | A2 | | B3 |
| 2 | C1 | | B3 |

| Expression | | | | | | | |
|---|---|---|---|---|---|---|---|
| Preconditions | | | | | | | |
| 1 | | | | | | | |
| 2 | | | | | | | |
| 3 | | | | | | | |
| Conditions | | Value Set | A | B | C | D | E | F | G |
| 1 | [Condition1] | {T, F} | T | - | - | F | | | |
| 2 | [Condition2] | {T, F} | F | - | T | F | | | |
| 3 | [Condition3] | {T, F} | - | T | F | F | | | |
| exprName | boolean ▼ | {T, F} | T | T | F | F | | | |

↙1704  ↙1706

↙1702

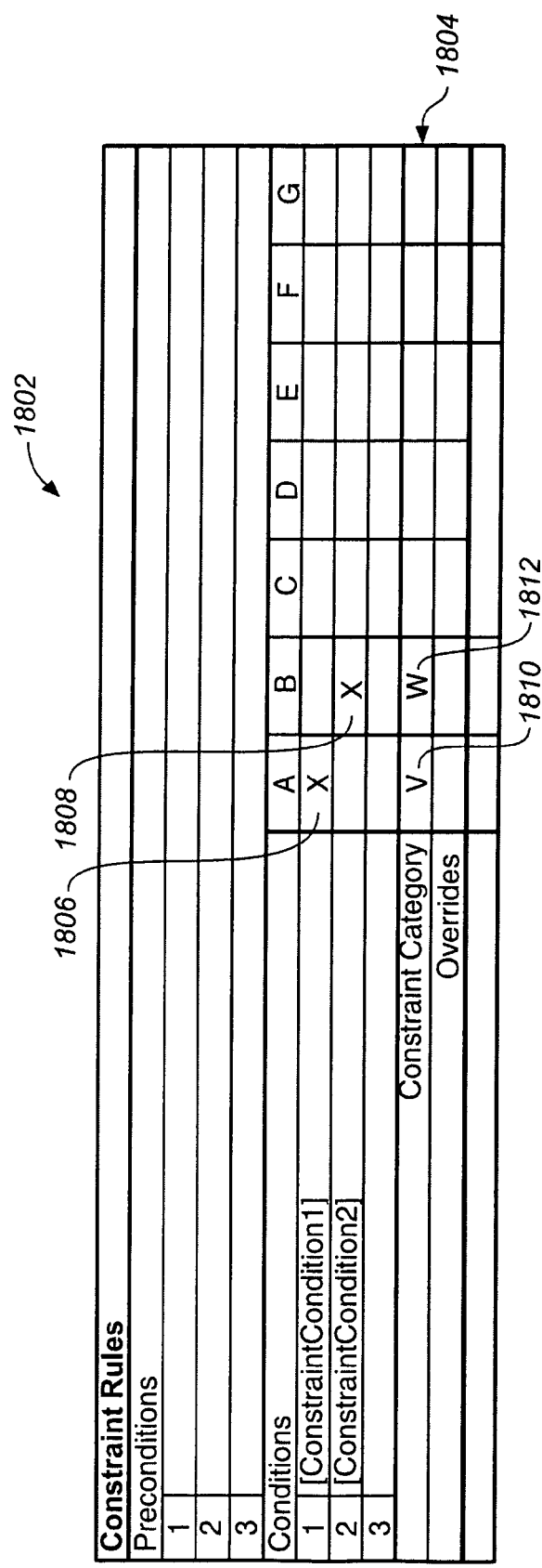
FIG._18

BUSINESS RULES USER INTERFACE FOR DEVELOPMENT OF ADAPTABLE ENTERPRISE APPLICATIONS

CROSS-REFERENCE TO RELATED APPLICATIONS

This application claims priority on the basis of commonly-owned U.S. Patent Application No. 60/250,869 for Business Rules User Interface Elements For Development Of Adaptable Enterprise Applications, filed Dec. 1, 2000, the disclosure of which is incorporated here by reference in its entirety.

BACKGROUND

The present invention relates to platforms for the development and deployment of computer program applications.

An enterprise application is a software program used by business people to increase productivity through automated data processing. Enterprise applications put into action a set of business requirements, expressed using natural language and "business speak". For the purposes of better defining the system, business requirements can be broken down into a set of interrelated business rules. A business rule, as defined by the GUIDE Business Rules Project, is a statement that defines or constrains some aspect of the business. A business rule is intended to assert business structure, or to control or influence the behavior of the business. A business rule should be atomic so that it cannot be broken down further without losing meaning.

Traditional implementations of business rules typically involve hard-coding them as procedural (flow-chartable) logic using programming languages such as Java, C++, and COBOL. Such business logic generally implements the business requirements of the enterprise application, providing the instructions necessary to store, retrieve, create, and manipulate data as well as validation constraints on such transactions. Implementing business logic using such languages requires highly trained software engineers and is relatively expensive and time-consuming. In addition, procedural programming languages do not support inferencing, which is a key feature of a robust rule-based system. They also make it prohibitively difficult to identify and resolve logic errors such as ambiguity and incompleteness among interrelated business rules.

An alternative approach to business rules automation is through expensive and difficult-to-use expert (rule-based) systems. This entails the conversion of the business rules into a formalized syntax that more closely represents the declarative nature of the business rules, generally requiring the services of highly trained knowledge engineers. The formalized rules are then processed through an inference engine, which itself requires tremendous programming effort to integrate with existing enterprise systems. Although some such rule-based systems provide the ability to easily modify the business rules, they fail to support certain business rule types such as constraints. And like procedural implementations, they provide no support for resolving logic errors.

Component technologies, in general, have interface and interoperability standards that facilitate rapid and straightforward integration of distributed computing applications. Components have delivered significant benefits for providing standardized low-level services, user interface controls and database access. Distributed component platforms enable the development of highly reusable server-side business components.

However, adapting component business logic requires manipulation of programmed code, which is difficult and, in any event, generally not allowed under the component license agreement. Although component behaviors may be influenced by parameterization, they are nevertheless limited to the problem domain contemplated by the component developer. On the other hand, declarative business rules not hard-coded into a component can be easily adapted to accommodate changing business requirements. A method for the automation of such rules is the inference engine. However, inference engines have been difficult to use within server-side component-based systems, with integration requiring coding to the proprietary API of the inference engine, and processing instructions represented in the proprietary syntax or programming language of each particular inference engine.

SUMMARY OF THE INVENTION

The invention provides a platform with an advantageous user interface for the development, deployment, and maintenance of computer program applications.

The invention can be implemented to realize one or more of the following advantages. A platform can be implemented in accordance with the invention that reconciles component and business rules technologies, combining the reusability features of component technologies with the adaptability features of business rules to create a powerful unified platform. One particular implementation of the platform integrates standards such as the Unified Modeling Language (UML), Enterprise JavaBeans (EJB), and Extensible Markup Language (XML) with business rule technologies. It enables non-technical business experts to play an active and central role in the development process of highly adaptable business applications. It offers a highly effective development methodology, an integrated set of standards-based tools, and a robust, scalable deployment platform. It provides an optimal environment for diverse enterprise applications.

The platform allows a developer to build, deploy and maintain Internet-based business (eBusiness) applications rapidly. It captures enterprise intelligence in the form of highly adaptable business rule components. This approach provides high levels of enterprise automation, leading to lower personnel costs and higher profits. In addition, because non-technical developers can rapidly adapt and extend platform-based applications, the applications can dynamically evolve with changing market conditions, business practices, and customer preferences.

The platform systematically separates business rules from procedural business process logic and thereby improves code quality and reduces development and maintenance costs. This makes rules technology accessible to mainstream developers and business experts. The platform enables non-technical personnel to develop, test, deploy and update sophisticated business rules declaratively, with no need for procedural programming, allowing for complex dynamically adaptable application behavior. These benefits are amplified for applications whose rules are volatile or subject to frequent changes, as well as applications impossible or prohibitively difficult to implement procedurally due to their logical complexity.

The platform offers many opportunities to streamline the development process. For example, it enables business experts and analysts to begin developing and testing rules as early as the requirements phase, facilitating early detection and correction of logical defects, and reducing the risks of application development.

Enterprise software projects tend to suffer from schedule and budget overruns. Some are a total failure in delivering the wrong solution that does not meet the business needs. The primary reason for such shortcomings of the traditional approaches is the propensity to initiate coding before the business problem and the appropriate solution are fully understood. Unfortunately, from a management point of view, progress tends to be measured by tangible deliverables. This early development of business rules, sometimes hand-in-hand with rapid prototyping of presentation elements, offers such tangible deliverables to help satisfy the progress-hungry business managers, while minimizing the high risks associated with the late discovery of logic errors.

Rapid-prototyping is very beneficial in clarifying application requirements, inducing user feedback, and reducing the chances of project failure. However, it also carries a high risk. Rapid prototypes are generally not developed based on sound software principles because they are intended to be throwaways. Unfortunately, due to time constraints and lack of foresight, most prototypes are just polished up and deployed into production, without regard for proper software engineering techniques. Such applications are generally unreliable and turn into expensive maintenance nightmares.

The early stage focus on development and clarification of business rules has all the benefits of rapid-prototyping without the shortcomings. Not only is the business logic completely fleshed out prior to programming, but also the resultant rules are not a throwaway. In fact, they become the cornerstone of the rest of the development lifecycle.

Enterprise Java business components tend to be thinner than alternative architectures such as CORBA and COM. This is because necessary middle-tier services such as security, concurrency control, transaction, and lifecycle management are not coded directly into the component, but are delegated to be handled by the component container. Nonetheless, Enterprise Java components still contain process or transactional logic and embedded business rules. The further extraction of business rules from such components has the added benefit of reducing their complexity even more. Consequently, the remaining logic of such components can be generated automatically from design models, minimizing the need for programming. Business rules tend to be the most volatile part of a business application. It is thus advantageous to maintain them using a highly adaptable environment. It is also advantageous to make them accessible to non-programmer business experts who can implement the changes directly. Traditional programming languages do not have these features and advantages.

Inference engines are an alternative mechanism to procedural programming languages for the processing of business logic, and have been used in specialized business applications for over a decade. The invention abstracts away the low-level API (Application Programming Interface) of inference engine as well as its rule language. As a result, the business developers work in a friendly IDE (Integrated Development Environment) using an implementation-neutral rule language that is targeted at them. This IDE also has special features to enable them to identify and resolve logic errors. In addition, the IDE enables business developers to tie the business rule implementations directly to the motivational statements from which they derive, maintaining business context and traceability through development, deployment, and future maintenance efforts. The IDE also enables the development of declarative platform-independent rule components called rulepacks. A rulepack is deployed as a black box component, with a well-defined programming interface. This component is no different from any other and therefore requires no additional programming skills to integrate into the enterprise application.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 1 is a block diagram of a business automation platform in accordance with the invention.

FIG. 2 is a block diagram of a deployment platform in accordance with the invention.

FIG. 3 is a flowchart of a simple development process suitable for use with the application development platform.

FIG. 4 shows a use case model displayed graphically by a user interface.

FIG. 5 shows a business object model displayed graphically by a user interface.

FIGS. 6, 7, 8, 9, 10, 11, 12, 13, 14, 15, 16, 17, and 18 show examples of user interface windows and elements displayed by implementations of the IDE.

Like reference numbers and designations in the various drawings indicate like elements.

DETAILED DESCRIPTION

Figure 7:
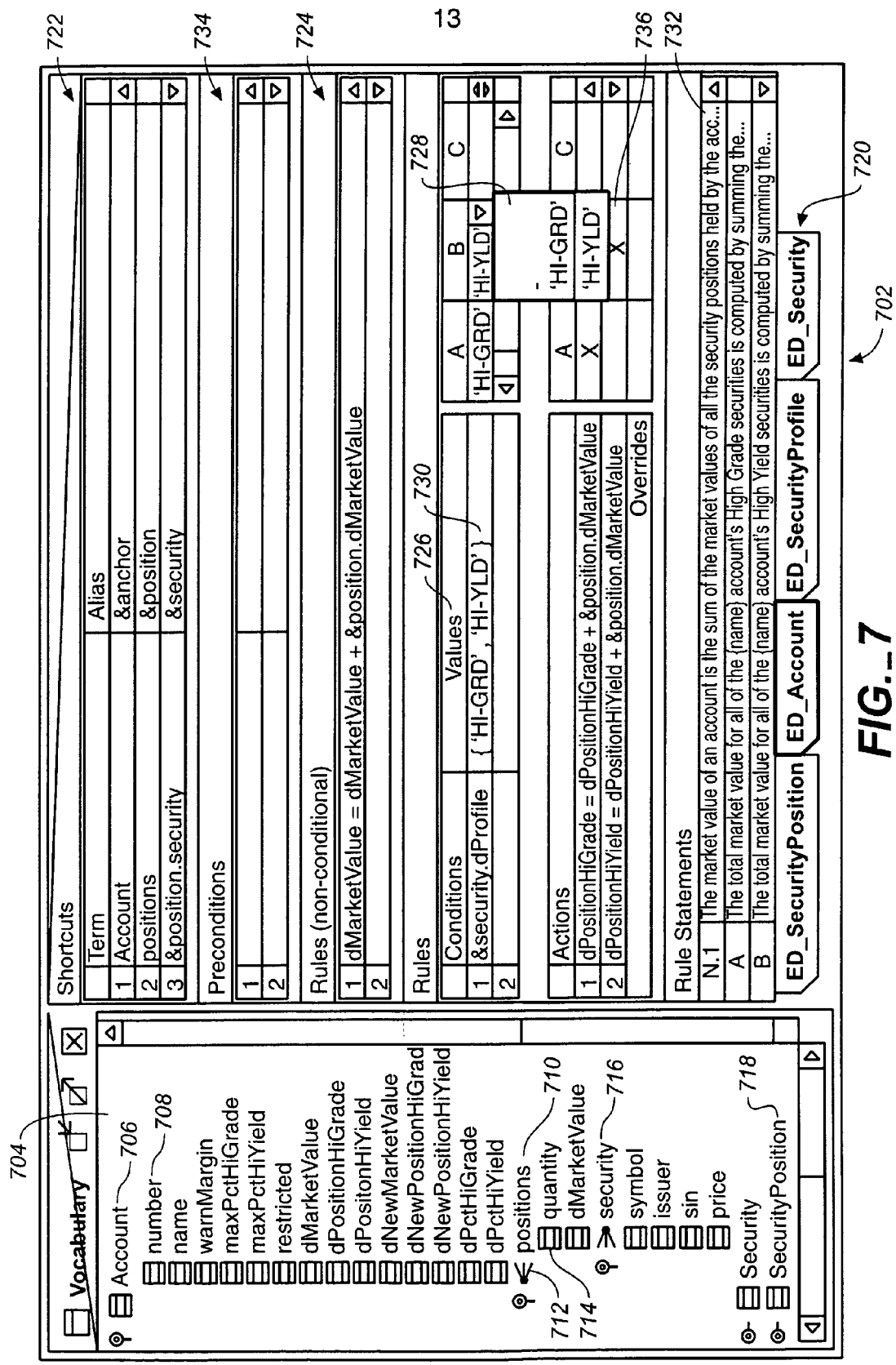

As shown in FIG. 1, a platform 100 in accordance with the invention is divided into two parts: a deployment platform 110 and a development platform 160. Each platform is further subdivided into application tiers: a front end (presentation); a middle tier (business logic), and a back end (database).

The front end of the development platform 160 is provided by off-the-shelf products conventionally used for rapid development of graphical user interfaces (GUIs), such as the Microsoft Frontpage® web site creation tool.

The middle tier of the development platform 160 implements the business logic of an application. In prior systems, business logic was implemented procedurally, requiring programmers to build and maintain application code. In contrast, the platform 160 implements a visually declarative approach. With the platform, business logic can be subdivided into two parts: business rules and process logic.

Business rules, which often make up the bulk of business logic, are built and maintained in the visually declarative environment of a rules IDE 180. This allows non-technical developers, such as business experts and analysts, to create and maintain enterprise business rules as reusable, adaptable components, which will be referred to as rulepacks. Rulepacks are declarative components that encapsulate a set of business rules automating the knowledge of a particular context of the business process. Rulepacks are made up of one or more rulesheets. Each rulesheet can contain one or more rules that apply within the same particular scope. Rulepacks are built and maintained by the IDE 180.

The IDE includes a vocabulary 181, which represents the business entities, their attributes, and their associations (relationships) in the form of a tree view. The vocabulary can be created within the IDE or imported from a UML business object model (also known as a class diagram) 174, or generated from business objects, from a relational database, or from an XML schema. The vocabulary tree view serves as an optimal drag-and-drop source for easy creation of rulesheets (see, e.g., FIG. 6). The IDE also includes a rulepack and rulesheet editor 182, which is a visual environment designed to be used by non-technical business domain experts to build and maintain rulepacks and their rulesheets. A rulesheet is a spreadsheet-like construct for intuitive development of logically correct sets of rules. The visual environment created by the rulepack editor 182 is illustrated in FIGS. 6–18.

Rulepacks, in the present implementation, are implemented as XML documents expressed in a rules markup language created for that purpose. The rules markup language defines an XML rules interchange format similar to that of the Business Rules Markup Language (BRML), which was defined by the CommonRules Java library, available from International Business Machines Corporation of Armonk, N.Y. The syntax of the rules markup language is shown in Table 1 at the end of this specification represented in an Extended BNF (Backus Normal Form).

The rule repository 150 facilitates collaborative rules development through source and version control, allowing creation of authorization and access privileges for rules documents. The rule repository 150 maintains version control, offering the opportunity to roll back to previous versions of rules when necessary. It can also track the business motivation behind every rule, such as business policy charters, business risks, customer preferences, or regulatory stipulations.

The process logic part of the business logic is a thin layer of transactional code, and in one implementation this is built and maintained using a UML modeler and code editor 170. When implemented in Enterprise Java architecture, the transactional code (i.e., the process logic) can be coded in Java using any standard Java IDE, such as the Together UML modeling tool and IDE products available from TogetherSoft Corporation of Raleigh, N.C. The Together products automatically generate the majority of the process logic (including Enterprise JavaBeans), so programming requirements are reduced to a minimum.

A developer will use the UML modeler and code editor 170 to build and maintain a use case model, a business object model (a UML class diagram), a component model, and various other UML models necessary to implement a complete enterprise application. For these purposes, the modeler and editor 170 includes a use case modeler 172, a business object modeler 174, and a component modeler 176, and other UML modelers. The modeler and editor 170 also includes an IDE (Integrated Development Environment) 178 that supports a Java development kit (JDK), optionally extended with a Java math library to support business domain calculations.

The use case modeler 172 is used to build and maintain business requirements visually in the form of UML-standard use cases. The business object modeler 174 is used to build and maintain an enterprise-level object model of all data elements. The enterprise-level model represents all data in the enterprise. It can be created from scratch or derived from existing enterprise databases. The objects of the enterprise-level object model also contain business functions. Business rules that are non-declarative in nature or involve an algorithm or complex mathematical calculation are captured as functions. The procedural component modeler 176 is used to build and maintain those procedural business components that use rulepacks.

The deployment platform 110 supports deployment on diverse distributed user interface devices 112, such as web browsers, telephones, personal digital assistants, and other client programs and access devices. Each user interface device merely needs to be able to communicate with supported middle tier application servers.

As shown in FIG. 1, the middle tier of an application includes a web server 120, a Java application server 130, and a business intelligence server 140. Any web server supporting JSP (Java Server Pages) and any Java application server can be used, such as a J2EE (Java 2 Enterprise Edition) compliant application server. In alternative implementations, the middle tier can be implemented using Microsoft® distributed Component Object Model (COM)-based technologies, including Active Server Pages (ASPs) and Microsoft® Transaction Server (MTS). The middle tier can also be implemented on a Microsoft .NET platform.

As shown in FIG. 2, the business intelligence server 140 manages rule components 142. A rule component contains a lightweight, high-performance rule engine. The rule engine can be implemented as an inference engine, for processing rules as such. For example, a JESS (Java Expert System Shell) or CLIPS (C Language Integrated Production System) rule engine can be used. Alternatively, rule components can be implemented to embody their rules as translated into a procedural programming language or into calls to a database query language such as SQL. A rule component deploys a rulepack as a functional knowledge unit. FIG. 2 depicts multiple rule components deployed in a J2EE environment. The user interface communicates with a servlet 122, which may be generated by a JSP, which communicates with session and entity beans 132, which in turn communicate with the rule components 142 through a standardized messaging scheme. Two types of messages are supported: synchronous (e.g., direct Java calls) and asynchronous (e.g., using XML-based messages).

A rule component 142 is preloaded with the rules in a rulepack for optimal performance. The rule components 142 can interact with various types of business components (not just Enterprise JavaBeans components) using standardized messaging (e.g., XML messaging). The business intelligence server 140 provides a central integration hub that can interact with diverse application components 132, such as Microsoft® COM (Component Object Model) components, CORBA (Common Object Request Broker Architecture) components, EJB components, and Java components. The business intelligence server 140 can turn any Java application server into an application integrator, acting as a control center for an enterprise information system.

The back end of the deployment platform 110 can include any number of databases 134 based on database management products from any number of vendors. The rule repository 150 is implemented as a database, such as a relational database. The business intelligence server 140 is a virtual extension of the rule repository 150, which remotely manages the lifecycle of all deployed rule components. Once a business rule is modified in the rule repository 150, all rule components containing rulepacks affected by the change are dynamically notified to refresh their business logic. This allows for real-time modification of system behavior without any downtime.

A simple application development methodology that takes advantage of the features of the application development platform 100 will now be described. Unlike traditional techniques that focus on a combination of data and process, or on objects that encapsulate both data and process, the methodology places business rules in the center of the development process.

Business rule analysis, as facilitated by the platform 100, accelerates the software development lifecycle by reducing unstructured requirements verbiage into concrete statements that are easily verified by business users. In addition, the methodology enables analysts and developers to identify, capture and test business rules from the very inception of a project. In addition, the methodology guarantees that UML-conforming documentation (such as use case models) will be created as an inherent byproduct of the software development process. Furthermore, the methodology ensures that the documents remain in synchronization with the application logic, because the business rules that the documents represent are literally part of the application.

By allowing developers to begin building and testing business rules at project inception, the methodology ensures healthy design disciplines, such as providing tangible design deliverables in a project's early phases. Moreover, business rules developed early in the development process are directly incorporated into the final application, resulting in cost savings when compared with traditional "throw away" prototyping techniques.

As shown in FIG. 3, in a typical development project, business analysts collaborate with subject matter experts to define high-level business requirements (step 310) using vocabulary understandable to the subject matter experts. Having the business requirements, the analysts create UML use cases (step 320) using the use case modeler 172, which allows the user to specify actors and their various usages of the system graphically, as illustrated in FIG. 4, where actor 404 is shown in a communicates relationship with use cases 406, 408, 410. Each use case contains a high-level written narrative that explains it in clear, concise business terms.

A business object model can be created from scratch or derived from an existing database (step 330). The business object modeler 176 can capture the business object model as a UML class diagram. An example of such a diagram is diagram 504 shown in user interface window 502 in FIG. 5. The IDE 180 transforms this into a vocabulary tree view for easy drag-and-drop functionality onto the rulesheets 182. Such a vocabulary tree view is shown in pane 604 of FIG. 6. However, the vocabulary can also be created directly in the rule IDE 180, without the need for an object model. The vocabulary can optionally have a name, illustrated as "FIM" 622 in pane 604.

In the tree view, the vocabulary is displayed in the form of a tree of business terms such as entities (non-leaf nodes), their attributes (leaves), and their relationships to other entities (named branches). Such a tree view presents a conceptual semantic model in a form that is understandable to the business user. The tree view can be used for building rules, test data, user interfaces, databases, and other application components. Its elements can be used by a user to drag-and-drop vocabulary terms onto the rulesheet. In the tree view, a vocabulary term can be either simple (root-level) or complex (branch-level). When an attribute node that is deeper than the first tier of leaf nodes is drag-and-dropped, relationship traversals are handled automatically using a dot-notation (e.g., Trade.security.symbol) giving the business term a specific context.

Next, business rules are developed and tested (step 340) using the vocabulary 181, the rulepack editor 182, and the tester 183. Business rules are captured as discrete rule sets (rulepacks). Business rules can be categorized into three types: constraints (rejecters), triggers (projectors), and derivations (producers). The rulepack editor 182 enables developers to compose all types of rules that operate on data structures defined in the business object model. Developers can drag-and-drop terms from a tree view of the vocabulary 181 onto a rulesheet in order to define the conditions and actions of each rulepack.

FIG. 6 shows a rulesheet containing constraints. Constraint rules allow developers to specify business rules that constrain a business and therefore define the boundaries for its valid state. Constraint rules are generally constraints such as data validation and integrity rules. The vocabulary 181 (FIG. 1) of the business object model is displayed in an equivalent tree view in a pane 604 at the left of the rulesheet. To the right of the tree view, the possible conditions (upper left quadrant 606) and actions (lower left quadrant 608) are tabulated. Because the word "condition" has different meanings according to context, the expression in a row in the upper left quadrant will occasionally be referred to as a "condition term" for the sake of clarity. The order in which actions are listed in the actions quadrant 608 can optionally be used to determine the order in which the actions are executed. However, it is advantageous that this not be done, because doing so would introduce a procedural aspect to the definition of rules that is inconsistent with the declarative design of the user interface.

The conditions and actions are tied together as rules, each rule being expressed in one of the vertical columns 610 spanning the two right quadrants of the rulesheet. The cells in a vertical rule column specify the truth values of the conditions—determined by the if-value cells in the upper right quadrant 612—necessary to trigger the execution of actions—determined by the then-value cells in the lower right quadrant 614. The if-part of a rule is the conjunction of the conditions defined by the if-values in one column.

The rule statements pane 616 displays a list of natural language statements of the rules (in business terms) implemented by the rulesheet. Each rule statement is tied to the corresponding rule column 610 with the same number 618. Each non-conditional rule can also have a business rule statement associated with it (e.g., statement 732 in FIG. 7). The business rule statements can optionally be linked to business policy charters and other supporting documents for the purpose of tracing the motivation behind the corresponding rules.

Actions typically take the form of a value assignment, which is effectively a derivation. The assigned value may be a constant, the value of a different attribute, or a calculation (which may involve business object method calls).

Optionally, actions may post a message of type violation, warning, or information. The particular action 620 illustrated in FIG. 6 posts a violation. Once a post action is triggered, the business rule statement associated with the rule is posted in the form of a message with a severity of violation, warning, or information. A message may be linked to a specific instance of a business entity to provide an appropriate context. Such messages are used to indicate the firing of a rule and can also serve as error messages displayed to the system user. They can, furthermore, help in educating novice users on the functionality of the system and the rules of the business as a whole. A specific type of message can also be used to deliver synchronous or asynchronous processing commands to other enterprise components. However, supporting the use of message posting for processing commands introduces an undesirable procedural element into the definition of rules. Thus, it is advantageous to avoid message posting and instead define attributes that can be tested by process control components. A more declarative alternative to capturing constraint rules is by using a special rulesheet, as illustrated in FIG. 18, which will be described later.

FIG. 7 shows in pane 704 a partially expanded vocabulary tree corresponding to the vocabulary tree shown in pane 604 of FIG. 6. All nodes of the tree at the root level, such as entity Account (node 706), are entities. The Account entity has been expanded by a user to show the attributes, such as the attribute number (node 708), of the Account entity. When an entity is expanded, its relationships with other entities, if any, are also shown. These relationships will have been defined, for example, by a UML business object model (also known as a class diagram), as described earlier.

Every association (relationship) between two entities has two role names, one at each end of the association (as shown in FIG. 5). These role names are used to traverse from one entity to another in the vocabulary tree view (and using the dot-notation). If no role name is specified, it is defaulted to the name of the corresponding entity, except that the role name begins with a small letter whereas the entity name begins with a capital letter. Thus, the role name "positions" in node 710 indicates that node 710 represents a relationship between an Account entity and a SecurityPosition entity. The icon 712 identifies this as a relationship and, in particular, as a one-to-many relationship. This node is used to traverse from Account to its corresponding SecurityPosition's. Note that SecurityPosition entity also has an "account" node that is used to traverse the same relationship in the opposite direction (not shown in the figure). The term "positions" can be thought of as the name of a relationship, which is a bidirectional relationship. In this user interface convention, the entity at one end of the relationship is named explicitly (in this example it is the Account entity) while the entity at the other end of the relationship (SecurityPosition) is named implicitly by the name of the relationship role name (positions). In alternative implementations, both a name for the relationship and the name of the entity at each can be shown explicitly.

As also shown in pane 704, the entity SecurityPosition (shown implicitly as positions) at node 710 has several attributes. Because node 710 has been expanded, those attributes, such as quantity (node 714), are shown. Also shown is a further relationship role named "security" (node 716), representing a relationship between entities SecurityPosition (in the context of node 710) and the entity Security. This latter node 716 is also expanded and shows the attributes of the entity Security.

It is worth noting that the relationships (associations) between entities may be such that there is a loop in the definition. In this situation, a developer is able to expand entities and relationships in the tree view without any limit imposed by vocabulary because the expansions are constructed on the fly. This allows a developer to use the tree view to construct a context of any depth for every attribute that is of interest to the developer.

To drag-and-drop a vocabulary element to a rulesheet, a developer will drag an attribute node of the vocabulary to the rulesheet. This will cause the attribute and its entire context to be inserted as a term wherever the drop part of the operation dictates. Thus, when a developer drags the node quantity 714 to the rulesheet, the term dropped will be Account.positions.quantity. If aliases have been defined for any part of the selected term, the alias will be used in the rulesheet for the sake of brevity and convenience. In FIG. 7, an alias "&position" has been defined as "positions" and Account has been identified as the anchor entity, so dragging the node quantity 714 to the rulesheet would result in the term &position.quantity being dropped.

FIG. 7 also shows a rulepack display 702 with multiple rulesheets displayed as tabs 720. The visible tab shows a rulesheet containing derivation rules (producers). Derivation rules allow developers to specify business rules that infer or calculate the value of derived fields. In this rulesheet the actions are statements that assign values to fields (i.e., they are assignment actions). The fields are identified in rows in the Actions pane, the values are in the corresponding then-value cells. In addition, this rulesheet also shows a pane 722 for entity shortcuts, called "Shortcuts", and a pane 724 for unconditional calculations, called "Rules (non-conditional)". The shortcuts link alias names to the object model. The non-conditional rules are business rules that fire without any conditions.

The rulesheet shown in FIG. 7 also shows the display (under the heading 'Values' 726) of a value set for a condition. The value set for a condition is the set of all possible if-values for the condition. In FIG. 7, this is the set {'HI-GRD', 'HI-YLD'} 730 for the security profile condition. Value sets can be declared for assignment actions as well as conditions. The value set for an assignment action is the set of all possible values for the assignment term. FIG. 7 also shows how the editing of a rule cell, in this case, for rule B, can be aided by a pre-populated drop-down list 728 of these possible values.

As shown in FIG. 7, an if-value 730 can be a string. An if-value can also be of any other data type, such as date, boolean, or numeric. As shown in FIG. 9, for example, an if-value can also include a comparison operator, such as ">=" or "<". If no operator is expressed, the operator "=" is implied. Also, a condition term can include a comparison operator, in which case the value set for the condition would be {T, F}, i.e., true and false.

As shown in FIG. 8, a then-value can be a string (as in cell 808). A then-value can be of any other simple data type. A then-value can also be a mark—such as represented by "X" in cell 736 in FIG. 7, for example—that indicates that the corresponding action is to be performed, without providing any data to the action.

A rulesheet can also have preconditions in a preconditions pane 734. Preconditions are conditions that apply to all rules. They are generally used to customize a rulesheet to activate only in a particular situation or for a particular instance of a business term. Preconditions are logically ANDed with the rest of the conditions of every rule on the rulesheet.

In the system being described, a user or developer—either directly or indirectly—can provide a value set for each condition term. This can be done through the IDE, in the definition of the vocabulary, or otherwise. With this information, the system can validate the rulesheet by applying completeness and ambiguity checks. In one implementation, the value set for a rule is checked for completeness heuristically by applying the following checks and corrections. A value set must have more than one value. If it does not, add a value representing OTHER to the set. A range of values must have no gaps. If a gap is found, add values to fill the gaps. For example, if the condition term is numeric and the value set being tested is {<15, 15–30}, then add a value so the value set is {<15, 15–30, >30}. A range of dates is tested and corrected in the same way. For any other kind of set, such as one enumerating the names of people, for example, the system can automatically, or the user can optionally, add the value representing OTHER to the set to ensure its completeness.

All developed rulepacks, rulesheets, and individual atomic rules are stored in the rules repository 150 and become part of an application rulebook, which contains all the rules for the application. Each rule may be reused in more than one rulesheet or rulepack. The repository keeps track of such interdependencies and forces rule integrity and consistency throughout the rulebook and therefore the enterprise.

The IDE has validation logic to detect and help eliminate logic errors in rulesheets, such as ambiguities, redundancies, or incompleteness. FIG. 8 shows a profiling rulesheet before ambiguity and completeness checks are performed. Rules A and B (columns 804 and 806) are determined to be ambiguous. Rules A and B are complex rules due to the existence of a do-not-care value (i.e., a dash) in their if-values. A do-not-care indicates that the rule applies for all possible values of a condition. Such rules can be broken down into simple rules with all specific values to aid in visualizing the source of the ambiguity. The IDE has expand and collapse functionalities for this purpose. FIG. 9 shows the rulesheet after an expansion, where rules A and B are expanded into rules {A.1, A.2} 904 and rules {B.1, B.2, B.3} 906 respectively. The source of the ambiguity is highlighted as being simple rules A.1 and B.1. For the exact same if-part (i.e., the conjunction of conditions with values 'A' and >=7), these rules take contradictory actions (i.e., set profile to 'HI-GRD' and set profile to 'HI-YLD'). Once an ambiguity is identified, it can resolved in one of three ways. If the actions are mutually exclusive (i.e., they cannot both happen simultaneously), the override feature can be used by a user to set precedence order as shown at 1004 in FIG. 10, where rule A overrides rule B. In more complex situations, the override input can indicate a set of rules, and in that case the set would be displayed. If the actions are not mutually exclusive, they can be combined into one rule. Should the ambiguity point to a logic error, the rules can be modified by the user in such a way as to resolve the ambiguity. A simple form of ambiguity is redundancy. This occurs when two rules are identical. It is resolved by removing one of the rules, which can be done automatically by the system.

FIG. 10 shows the rulesheet in FIG. 8 after a logical completeness check is performed. The complete set of distinct possible if-parts for the entire rulesheet is compared to the if-parts actually in the rulesheet. The missing ones are identified and added to the rulesheet automatically; in the present case, rules C and D (columns 1006) are added to complete the rulesheet. Such an incompleteness generally indicates an oversight on the part of the developer and results in a new business rule added to the requirements, an example of which is shown in FIG. 11.

FIG. 12 shows the same rulesheet after it has been collapsed into the smallest possible set of complex rules. It also shows how a rule cell (e.g., if-value cell 1204) can contain a subset of the values allowed by the condition value set (i.e., the subset {'BBB', 'BB'} as the if-value for the rating condition in rule C). Should a cell contain the entire value set, it is automatically turned into a do-not-care value.

FIG. 13 shows how business rules can be tested immediately after they are coded, independent of other development activities. The left pane 1306 represents the input into a rules component 142. This can be developed using drag-and-drop from the vocabulary pane 1304 or directly from a database or a test suite repository. The right pane 1308 shows the output of the rules component, which is the contents of the left pane 1306 modified by the rule engine of the rules component. In FIG. 13, for example, the rule component calculated a value for the term dProfile for each of four different securities, which were provided as input in the input pane. The difference between the two panes can be highlighted by a tester subsystem to aid the developer in determining what rules fired. Additional features such as breakpoints and watch windows can be added to aid the user in stepping through the processing of the rulesheet.

While rules development and testing are in progress, developers can simultaneously code custom processes (or acquire pre-written components if available) and begin implementing the user interface. These activities produce feedback that can be used to refine requirements, UML models, and the business rules, resulting in an iterative development cycle. Development cycle iterations continue as necessary until the application is ready for deployment and then throughout its life as features are changed, upgraded or extended.

FIG. 14 shows an alternative user interface display for a rulesheet 1402. This is illustrated without scroll bars, vocabulary tree view, and other user interface elements shown, for example, in FIG. 7. This display differs from the one illustrated in FIG. 7, for example, in that it includes a non-conditional (N/C) column 1404. When a cell in this column is checked, as is shown for cell 1406, the corresponding actions are always performed, subject to any preconditions applicable to the rulesheet. In the illustrated rulesheet 1402, the action [Action1] is a non-conditional action. On the other hand, [Action2] is performed if and only if the value of [Condition1] is val1 and the value of [Condition2] is val3.

The user interface display of FIG. 14 also differs from the one illustrated in FIG. 7 in that in FIG. 14, a rule is represented by a cell, such as cell 1408, rather than by a column, such as one of the columns 610 (FIG. 6). Thus, multiple rules having the same if-part can be represented in the same column.

FIG. 15 shows an alternative display 1502 corresponding to display 1402 (FIG. 14) in which the rows and columns are flipped. The IDE can allow a user to select one or to switch between these two forms of display.

As shown in FIG. 16, an overrides section can be made visible if overrides are necessary. Overrides were described in reference to FIG. 10. Each row 1604, 1606 represents an override rule. Each override can be tied to a rule statement and therefore can have a rule name.

In FIG. 16, the overrides indicate the following. When conditions would cause both rule A2 (cell 1610) and rule B3 (cell 1612) to be performed, rule A2 overrides rule B3; that is, rule A2 is dominant and therefore operative, and rule B3 is not. Similarly, rule C1 overrides rule B3.

FIG. 17 shows a display matrix 1702 for an expression rulesheet. An expression rulesheet can be used to define expressions of any data type, e.g., text, numeric, and boolean. Cell 1704 carries the name that is defined. Cell 1706, which can be implemented as a pull-down pick list, carries the data type. In FIG. 17, the type is boolean and the name is exprName. In the example of FIG. 17, if any preconditions and rule A are satisfied, then exprName is given a value of T. Expressions defined using this rulesheet can be used as derived business terms on other rulesheets. The expressions defined are automatically added to the vocabulary as an attribute of the anchor entity of the rulesheet. The rules that define an expression are thus reused in and simplify higher level rulesheets. This allows rulesheets to be logically combined for building more complex rulesheets and for creating levels of abstraction in the definition of terms. This is fundamentally how rulesheets are logically linked to each other.

FIG. 18 shows a display matrix 1802 for a constraint rulesheet. A constraint rulesheet can be used to define constraints such as data consistency constraints or business policy constraints. Constraints can be of different categories, represented by the values in a constraint category row 1804 in the matrix. In the illustrated rulesheet, when [Constraint-Condition1] is satisfied, constraint rule A fires, and the category of the constraint is "V", which indicates a violation (represented in cell 1810). Similarly, when [ConstraintCondition2] is satisfied, constraint rule B fires, and the category of the constraint is "W", which indicates a warning (represented in cell 1812). Constraint categories can be represented with icons as well as text, and they can be structured to have, for example, multiple levels representing different aspects of the constraints.

As previously mention, each column (in the implementation of FIG. 6) or each cell (in the implementation of FIG. 14) that represents a rule can have a name associated with it. The name can be used to check the state of the rule. For example, the rule name can be referred to in the vocabulary as an attribute of the anchor entity of the rulesheet. The anchor entity is one of the root entities (if there is more than one) of the vocabulary and is designated as such by the developer of the rulesheet. For example, in FIG. 6, the developer has designated the entity Account as the root entity by giving it the alias "&anchor". Thus, having a rule named RuleName in a rulesheet with an anchor entity named Entity, for example, the state of this rule can be checked using a term of the form Entity.RuleName.fired, which returns a boolean value, namely true if the rule has executed and false if the rule has not executed. Other attributes of the rule, in addition to whether it has been fired, such as the constraint category with the associated rule, can also be defined in the vocabulary so that they can be checked.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

TABLE 1

```
Helpers
    all = [0..127];
    lf = 10;
    cr = 13;
    uppercase = ['A'..'Z'];
    lowercase = ['A'..'Z'];
    digit = ['0'..'9'];
    number = digit+;
    line_terminator = lf | cr | cr lf;
    input character = [all - [cr +lf]];
    simple_escape_sequence = '\'' | '\"' | '\?' | '\\' |
         '\a' | '\b' | '\f' | '\n' | '\r' | '\t' | '\v';
    octal_digit = ['0' .. '7'];
    octal_escape_sequence = '\' octal_digit octal_digit? octal_digit?;
    hexadecimal digit = [digit +[['a' .. 'f']+['A' .. 'F']]];
    hexadecimal_escape_sequence = '\x' hexadecimal_digit+;
    escape_sequence = simple_escape_sequence | octal_escape_sequence |
         hexadecimal_escape_sequence;
    s_char = [all - ['"' + ['"' + ['\' + [lf + cr]]]]] | escape_sequence;
    s_char_sequence = s_char+;
    br_char = [all - ['{' + ['}' + [lf + cr]]]];
    br_char_sequence = br_char+;
    h_set = 'Set';
    h_bag = 'Bag';
    h_sequence = 'Sequence';
    h_collection = 'Collection';
    h_rule = 'Rule';
    h_precond = 'Precondition';
    h_nrule = 'NRule';
```

TABLE 1-continued

```
    h_cond = 'Condition';
    h_act = 'Action';
    h_valueset = 'Valueset';
    h_actionset = 'Actionset';
    h_rulesheet = 'Rulesheet';
    h_brstate = 'BRStatement';
    h_dtilda = '~~';
    h_from = 'From';
    h_asgn = 'Assign';
Tokens
    comment = '--' [[all – 10] – 13]* [10 + 13]?;
    dot = '.';
    arrow = '->';
    not = 'not';
    mult = '*';
    div = '/';
    plus = '+';
    minus = '–';
    mod = '%';
    exp = '**';
    context = 'context';
    enum = 'enum';
    t_pre = 'pre';
    t_rule = h_rule;
    t_precondition = h_precond;
    t_nrule = h_nrule;
    t_condition = h_cond;
    t_action = h_act;
    t_valueset = h_valueset;
    t_actionset = h_actionset;
    t_rulesheet = h_rulesheet;
    t_brstatement = h_brstate;
    t_from = h_from;
    t_asgn = h_asgn;
    equal = '=';
    n_equal = '<>';
    lt = '<';
    gt = '>';
    lteq = '<=';
    gteq = '>=';
    p_equal = '+=';
    m_equal = '–=';
    and = 'and';
    or = 'or';
    xor = 'xor';
    implies = 'implies';
    l_par = '(';
    r_par = ')';
    l_bracket = '[';
    r_bracket = ']';
    l_brace = '{';
    r_brace = '}';
    semicolon = ';';
    dcolon = '::';
    colon = ':';
    comma = ',';
    channel = '#';
    at = '@';
    bar = '|';
    ddot = '..';
    apostroph = '''';
    quote = '"';
    amp = '&';
    qmark = '?';
    inc_range = '[..]';
    exc_range = '(..)';
    incl_range = '[..)';
    incr_range = '(..]';
    t_let = 'let';
    t_in = 'in'.
    t_if = 'if';
    t_then = 'then';
    t_else = 'else';
    endif = 'endif';
    t_set = h_set;
    t_bag = h_bag;
    t_sequence = h_sequence;
    t_collection = h_collection;
    bool = 'true' | 'false' | 'T' | 'F';
```

TABLE 1-continued

```
simple_type_name = ( uppercase (lowercase | digit | uppercase |
    '_')* ) | h_set | h_bag | h_sequence | h_collection;
name = lowercase (lowercase | digit | uppercase | '_')*;
new_line = line_terminator;
int = number;
real = number '.' number;
blank = 9 |' '*;
tab = 9;
string_lit = ''' s_char sequence? ''';
time_lit = '"' s_char sequence? '"';
br_lit = h_dtilda br_char_sequence? h_dtilda;
Ignored Tokens
    comment, new_line, blank, tab, amp, qmark;
Productions
    rulesheet =
        {rulesheet} t_rulesheet id [priority]:int let_expression*
        precondition* nc_rule* condition* action* rule* |
        {fragment} rule_fragment;
    id = {name} name | {typename} simple_type_name | {number} int ;
    rule_fragment =
        {declaration} let_expression |
        {precondition} precondition |
        {nc rule} nc_rule |
        {condition} condition |
        {action} action |
        {when} when_expression |
        {do} do_expression |
        {brstatement} brstatement;
    precondition = t_precondition expression;
    nc rule = t_nrule id action_expression action_tail*
    condition = t_condition id expression t_valueset valueset;
    valueset = l_brace unary_relational_expression valueset_tail* r_brace;
    valueset_tail = comma unary_relational_expression;
    when_expression = t_valueset not? [whenset]:valueset
        when_tail* t_from [fromset]:valueset
    when_tail = comma not? valueset;
    unary_relational_expression = {unary} relational_expression_tail |
        {postfix}postfix_expression | {range} range_expression;
    range_expression = [left_expr]:postfix_expression range_op
        [right_expr]:postfix_expression;
    range_op = {inclusive} inc_range | {exclusive} exc_range |
        {inc_left} incl_range | {inc_right} incr_range ;
    action =
        t_action id action_expression action_tail* t_actionset actionset?;
    actionset = l_brace postfix_expression actionset_tail* r_brace;
    actionset_tail = comma postfix_expression ;
    do_expression =
        t_actionset l_brace postfix_expression r_brace t_from actionset;
    brstatement = t_brstatement id br_body*;
    br_body = {text} br_lit | {value} l_brace postfix_expression r_brace;
    rule = t_rule id conditionlist* actionlist*;
    conditionlist = t_condition id valueset;
    actionlist = t_action id postfix_expression;
    action_expression = {assign} assignment_expression |
        {expr} expression ;
    action_tail = semicolon action_expression ;
    assignment_expression =
        t_asgn postfix_expression assignment_operator expression ;
    assignment_operator = {equal} equal | {plus_equal} p_equal |
        {minus equal} m_equal ;
    expression = let_expression* logical_expression ;
    if_expression =
        t_if [if_branch]:expression t_then [then branch]:expression t_else
            [else_branch]:expression endif ;
    logical_expression = relational_expression logical_expression_tail* ;
    logical_expression_tail = logical_operator relational_expression ;
    relational_expression =
        additive_expression relational_expression_tail? ;
    relational_expression_tail = relational_operator additive_expression;
    additive_expression =
        multiplicative_expression additive_expression_tail* ;
    additive_expression_tail = add_operator multiplicative_expression ;
    multiplicative_expression =
        unary_expression multiplicative_expression_tail* ;
    multiplicative_expression_tail = multiply_operator unary_expression ;
    unary_expression = {unary} unary_operator postfix_expression |
        {postfix} postfix_expression ;
```

TABLE 1-continued

```
postfix_expression = primary_expression postfix_expression_tail* ;
postfix_expression_tail = postfix_expression_tail_begin feature_call;
postfix_expression_tail_begin = {dot} dot | {arrow} arrow;
primary_expression = {lit_col} literal_collection |
   {literal} literal | {feature} path_name time_expression? qualifiers?
   feature_call_parameters? | {parentheses} l_par expression r_par |
   {if} if_expression ;
feature_call_parameters {empty} l_par r_par |
   {concrete} l_par expression fcp_helper* r_par |
   ( l_par declarator? actual_parameter_list? r_par ) ;
fcp_helper = {comma} comma expression |
   {colon} colon simple_type_specifier |
   {iterate} semicolon name colon simple_type_specifier equal
   expression | {bar} bar expression ;
let_expression =
   t_let name let_expression_type_declaration? equal expression t_in ;
let_expression_type_declaration = colon path_type name ;
literal = {strinq} string_lit | {real} real | {integer} int |
   {boolean} bool | {enum} channel name | {time} time_lit;
enumeration_type =
   enum l_brace channel name enumeration_type_tail* r_brace ;
enumeration_type_tail = comma channel name ;
simple_type_specifier = {path} path_type_name |
   {enum} enumeration_type ;
literal_collection =
   collection_kind l_brace expression list_or_range? r_brace;
expression_list_or_range = expression expression_list_or_range_tail? ;
expression_list_or_range_tail = {list} expression_list_tail+ |
   {range} ddot expression ;
expression_list_tail = comma expression ;
feature_call =
   path_name time_expression? qualifiers? feature_call_parameters? ;
qualifiers = l_bracket actual_parameter_list r_bracket ;
declarator =
   {standard} name declarator_tail* declarator_type_declaration? bar |
   {iterate} [iterator]:name [iter_type]:declarator_type_declaration
   semicolon [accumulator]:name [acc_type]:declarator_type_declaration
   equal expression bar;
declarator_tail = comma name ;
declarator_type_declaration = colon simple_type_specifier ;
path_type_name = type_name_path_type_name_tail* ;
path_type_name_tail = dcolon type_name ;
type_name = {non_collection} simple_type_name |
   {collection} collection_type l_par simple_type_name r_par;
collection_type {set} t_set | {bag} t_bag | {sequence} t_sequence |
   {collection} t_collection;
path_name = path_name_begin path_name_tail* ;
path_name_begin = {type_name} type_name | {name} name ;
path_name_tail = dcolon path_name_end ;
path_name_end = {type_name} type_name | {name} name ;
time_expression = at t_pre ;
actual_parameter_list = expression actual_parameter_list_tail* ;
actual_parameter_list_tail = comma expression ;
logical_operator = {and} and | {or} or |
   {xor} xor | {implies} implies;
collection_kind = {set} t_set | {bag} t_bag |
   {sequence} t_sequence | {collection} t_collection ;
relational_operator = {equal} equal | {n_equal} n_equal |
   {gt} gt | {lt} lt | {gteq} gteq | {lteq} lteq ;
add_operator = {plus} plus | {minus} minus;
multiply_operator = {mult} mult | {div} div | {mod} mod | {exp} exp;
unary_operator = {minus} minus | {not} not;
```

The invention has been described in terms of particular embodiments. Other embodiments are within the scope of the following claims. For example, the steps of the invention can be performed in a different order and still achieve desirable results. The invention can be implemented in other component architectures. For example, the invention can be implemented using Microsoft APS (Active Server Pages) and COM (Component Object Model) or DCOM (Distributed Component Object Model) technologies or CORBA (Common Object Request Broker Architecture) rather than Java-based technologies, and programmed components of the invention can be programmed in a language other than Java, for example, C++.

What is claimed is:

1. A computer program product, tangibly stored on a computer-readable medium, for interacting with a user to define business rules in a declarative manner, comprising instructions operable to cause a computer coupled to a display device to:

display a rule set as an editable list of conditions and an editable list of actions, the conditions and actions being linked to each other by the combination of an editable list of if-values and an editable list of then-values, wherein if-values and then-values are explicitly linked to each other, conditions and if-values are explicitly linked to each other, and then-values and actions are explicitly linked to each other in the displayed lists;

receive from a user inputs editing one or more of the editable lists;

display the editable lists in a matrix structure of four quadrants, wherein an editable list of condition terms and an editable list of action terms are displayed in adjacent quadrants, and the editable list of if-values and the editable list of then-values are displayed in adjacent quadrants; and use adjacency of if-values and then-values to represent a conditional rule implementation, where when the specified conditions are true then the corresponding actions are executed.

2. The product of claim 1, wherein:

the matrix structure of four quadrants is displayed in a user interface element further comprising a display area for displaying preconditions; and the product further comprises instructions to receive from a user input to create and edit preconditions.

3. The product of claim 1, wherein:

the matrix structure of four quadrants is displayed in a user interface element further comprising a display area for displaying shortcuts; and the product further comprises instructions to receive from a user inputs to create and edit shortcuts.

4. The product of claim 3, wherein a first condition term is a logical expression with a boolean value and the corresponding if-value is either true or false.

5. The product of claim 1, wherein:

the matrix structure of four quadrants is displayed in a user interface element further comprising a display area for displaying non-conditional rules; and the product further comprises instructions to receive from a user inputs to create and edit non-conditional rules.

6. The product of claim 1, wherein:

the actions are expression-defining actions and the if-values and the then-values comprise boolean values.

7. The product of claim 6, wherein each of the expression-defining actions comprises an element specifying a data type.

8. The product of claim 6, further comprising instructions to:

add the expressions defined in the rule set to a vocabulary of a package of rules.

9. The product of claim 1, further comprising instructions to:

display the rule set as part of a package of rules, the package containing at least one rule and at least one rule set, each rule in the package being in exactly one of the sets of rules in the package.

10. The product of claim 9, further comprising instructions to:

receive an input from a user specifying a test input for the package of rules; and display the test input in one pane while simultaneously displaying the corresponding output from the package of rules in another pane.

11. The product of claim 9, further comprising instructions to:

receive from a user an input selecting one of the sets of rules of the package for editing.

12. The product of claim 9, further comprising instructions to:

display the package with one or more tabs, each tab representing a rule set.

13. The product of claim 1, further comprising instructions to:

display a value set for each condition, where the values in the value set are all possible if-values of the corresponding condition.

14. The product of claim 1, further comprising instructions to:

display a vocabulary in the form of a tree view of business terms and their traversable relationships that can be drag-and-dropped in defining conditions and actions.

15. The product of claim 1, further comprising instructions to:

display business rule statements in plain language, each business rule statement being linked to a rule.

16. The product of claim 1, further comprising instructions to:

display shortcuts as an editable list of complex business terms and corresponding aliases, a complex business term being a business term with a specific scope determined by relationship traversals.

17. The product of claim 1, further comprising instructions to:

display preconditions, where each precondition acts as an additional condition for each rule in the rule set.

18. The product of claim 1, further comprising instructions to:

display a non-conditional rule column or row.

19. The product of claim 1, further comprising instructions to:

display non-conditional rules, a non-conditional rule being a rule that fires without any conditions other than the preconditions of the rule set.

20. The product of claim 1, further comprising instructions to:

receive an input from a user setting an override precedence of one rule over another rule in the rule set; and display the user-defined precedence.

21. A computer program product, tangibly stored on a computer-readable medium, for interacting with a user to define business rules in a declarative manner, comprising instructions operable to cause a computer coupled to a display device to:

display a rule set as an editable list of conditions and an editable list of actions, the conditions and actions being linked to each other by the combination of an editable list of if-values and an editable list of then-values, wherein if-values and then-values are explicitly linked to each other, conditions and if-values are explicitly linked to each other, and then-values and actions are explicitly linked to each other in the displayed lists;

receive from a user inputs editing one or more of the editable lists;

display the editable lists in a matrix structure of four quadrants, wherein an editable list of condition terms is displayed in an upper left quadrant, an editable list of action terms is displayed in a lower left quadrant, the editable list of if-values is displayed in an upper right quadrant, and the editable list of then-values is displayed in a lower right quadrant; and use each vertical column spanning the two right quadrants to represent a conditional rule implementation, where when the specified conditions are true then the corresponding actions are executed.

22. The product of claim 9, wherein all if-values and then-values in the same vertical column of values in the two right quadrants are linked to each other to define a rule.

23. The product of claim 9, wherein a second condition term is a business term and the corresponding if-value is a permitted value or value range of the business term.

24. The product of claim 9, wherein a first action term is a simple term and the corresponding then-value is a value that can be assigned to the simple term.

25. The product of claim 21, wherein a second action term is an assignment expression and the corresponding then-value is a check-mark value or not, the presence of the check-mark value specifying that the assignment expression is to be performed.

26. The product of claim 21, wherein a fourth action term is a post-message expression and the corresponding then-value is a check-mark value or not, the presence of the check-mark value specifying that the post-message expression is to be performed.

27. The product of claim 26, wherein the action specified by the fourth action term is to post a message for consumption by a human consumer.

28. The product of claim 26, wherein the action specified by the fourth action term is to post a message for consumption by a software component.

29. A computer program product, tangibly stored on a computer-readable medium, for interacting with a user to define business rules in a declarative manner, comprising instructions operable to cause a computer coupled to a display device to:

display a rule set as an editable list of conditions and an editable list of actions, the conditions and actions being linked to each other by the combination of an editable list of if-values and an editable list of then-values, wherein if-values and then-values are explicitly linked to each other, conditions and if-values are explicitly linked to each other, and then-values and actions are explicitly linked to each other in the displayed lists;

receive from a user inputs editing one or more of the editable lists;

display a value set for each condition, where the values in the value set are all possible if-values of the corresponding condition; and display in an if-value cell a pull-down list populated with the values in the value set of the corresponding condition and a value of do-not-care.

30. The product of claim 29, wherein the pull-down list is further populated with a value representing OTHER.

31. A computer program product, tangibly stored on a computer-readable medium, for interacting with a user to define business rules in a declarative manner, comprising instructions operable to cause a computer coupled to a display device to:

display a rule set as an editable list of conditions and an editable list of actions, the conditions and actions being linked to each other by the combination of an editable list of if-values and an editable list of then-values, wherein if-values and then-values are explicitly linked to each other, conditions and if-values are explicitly linked to each other, and then-values and actions are explicitly linked to each other in the displayed lists;

receive from a user inputs editing one or more of the editable lists;

display a value set for each condition, where the values in the value set are all possible if-values of the corresponding condition; and display a rule having a do-not-care if-value for a condition as multiple simple rules by displaying one simple rule for each value in the value set for the condition having the do-not-care value.

32. A computer program product, tangibly stored on a computer-readable medium, for interacting with a user to define business rules in a declarative manner, comprising instructions operable to cause a computer coupled to a display device to:

display a rule set as an editable list of conditions and an editable list of actions, the conditions and actions being linked to each other by the combination of an editable list of if-values and an editable list of then-values, wherein if-values and then-values are explicitly linked to each other, conditions and if-values are explicitly linked to each other, and then-values and actions are explicitly linked to each other in the displayed lists;

receive from a user inputs editing one or more of the editable lists; and display a value set for each assignment action, where the values in the value set are all possible then-values of the corresponding assignment action, the possible values being those values that can be assigned by the corresponding action.

33. The product of claim 32, further comprising instructions to:

display in a then-value cell a pull-down list populated with the values in the value set of the corresponding assignment action.

34. A computer program product, tangibly stored on a computer-readable medium, for interacting with a user to define business rules in a declarative manner, comprising instructions operable to cause a computer coupled to a display device to:

display a rule set as an editable list of conditions and an editable list of actions, the conditions and actions being linked to each other by the combination of an editable list of if-values and an editable list of then-values, wherein if-values and then-values are explicitly linked to each other, conditions and if-values are explicitly linked to each other, and then-values and actions are explicitly linked to each other in the displayed lists;

receive from a user inputs editing one or more of the editable lists; and display an incompleteness in the rule set by auto-creating and displaying rules having combinations of possible if-values not otherwise covered by the rule set.

35. A computer program product, tangibly stored on a computer-readable medium, for interacting with a user to define business rules in a declarative manner, comprising instructions operable to cause a computer coupled to a display device to:

display a rule set as an editable list of conditions and an editable list of actions, the conditions and actions being linked to each other by the combination of an editable list of if-values and an editable list of then-values, wherein if-values and then-values are explicitly linked to each other, conditions and if-values are explicitly linked to each other, and then-values and actions are explicitly linked to each other in the displayed lists;

receive from a user inputs editing one or more of the editable lists; and display a logical ambiguity in the rule set by highlighting rules that can produce different actions for the exact same conditions.

36. A computer program product, tangibly stored on a computer-readable medium, for interacting with a user to define business rules in a declarative manner, comprising instructions operable to cause a computer coupled to a display device to:
   display a rule set as an editable list of conditions and an editable list of actions, the conditions and actions being linked to each other by the combination of an editable list of if-values and an editable list of then-values, wherein if-values and then-values are explicitly linked to each other, conditions and if-values are explicitly linked to each other, and then-values and actions are explicitly linked to each other in the displayed lists;
   receive from a user inputs editing one or more of the editable lists; and
   display a complex rule as multiple simple rules in response to a user request to expand the complex rule, a complex rule being a rule having a do-not-care if-value for a condition, and each of the multiple simple rules having one of the possible if-values for the condition having the do-not-care value.

37. A computer-implemented method for interacting with a user to define business rules in a declarative manner, the method comprising:
   displaying a rule set as an editable list of conditions and an editable list of actions, the conditions and actions being linked to each other by the combination of an editable list of if-values and an editable list of then-values, wherein if-values and then-values are explicitly linked to each other, conditions and if-values are explicitly linked to each other, and then-values and actions are explicitly linked to each other in the displayed lists;
   receiving from a user inputs editing one or more of the editable lists;
   displaying the editable lists in a matrix structure of four quadrants, wherein an editable list of condition terms is displayed in an upper left quadrant, an editable list of action terms is displayed in a lower left quadrant, the editable list of if-values is displayed in an upper right quadrant, and the editable list of then-values is displayed in a lower right quadrant; and
   using each vertical column spanning the two right quadrants to represent a conditional rule implementation, where when the specified conditions are true then the corresponding actions are executed.

38. The method of claim 37, wherein:
   the actions are expression-defining actions and the if-values and the then-values comprise boolean values; and the method further comprises adding the expressions defined in the rule set to a vocabulary of a package of rules.

39. The method of claim 37, wherein:
   the matrix structure of four quadrants is displayed in a user interface element further comprising a display area for displaying preconditions; and
   the method further comprises receiving from a user inputs to create and edit preconditions.

40. The product of claim 37, wherein:
   the matrix structure of four quadrants is displayed in a user interface element further comprising a display area for displaying shortcuts; and
   the method further comprises receiving from a user inputs to create and edit shortcuts.

41. The product of claim 37, wherein:
   the matrix structure of four quadrants is displayed in a user interface element further comprising a display area for displaying non-conditional rules; and
   the method further comprises receiving from a user inputs to create and edit non-conditional rules.

42. The method of claim 37, wherein all if-values and then-values in the same vertical column of values in the two right quadrants are linked to each other to define a rule.

43. The method of claim 37, further comprising:
   displaying the rule set as part of a package of rules, the package containing at least one rule and at least one rule set, each rule in the package being in at least one of the sets of rules in the package.

44. The method of claim 43, further comprising:
   receiving an input from a user specifying a test input for the package of rules; and
   displaying the test input in one pane while simultaneously displaying the corresponding output from the package of rules in another pane.

45. The method of claim 37, further comprising:
   displaying a value set for each condition, where the values in the value set are all possible if-values of the corresponding condition; and
   displaying a value set for each assignment action, where the values in the value set are all possible then-values of the corresponding assignment action, the possible values being those values that can be assigned by the corresponding action.

46. The method of claim 37, further comprising:
   displaying an incompleteness in the rule set by auto-creating and displaying rules having combinations of possible if-values not otherwise covered by the rule set; and
   displaying a logical ambiguity in the rule set by highlighting rules that can produce different actions for the exact same conditions.

47. The method of claim 37, further comprising:
   displaying a complex rule as multiple simple rules in response to a user request to expand the complex rule, a complex rule being a rule having a do-not-care if-valve for a condition, and each of the multiple simple rules having one of the possible if-valves for the condition having the do-not-care value.

48. The method of claim 37, further comprising:
   displaying a vocabulary in the form of a tree view of business terms and their traversable relationships that can be drag-and-dropped in defining conditions and actions.

49. The method of claim 37, further comprising:
   displaying business rule statements in plain language, each business rule statement being linked to a rule;
   displaying shortcuts as an editable list of business terms and corresponding aliases;
   displaying preconditions, where each precondition acts as an additional condition for each rule in the rule set; and
   displaying non-conditional rules, a non-conditional rule being a rule that fires without any conditions other than the preconditions of the rule set; and
   displaying a user-defined override precedence of one rule over another rule in the rule set.

\* \* \* \* \*

UNITED STATES PATENT AND TRADEMARK OFFICE
CERTIFICATE OF CORRECTION

PATENT NO. : 7,020,869 B2
APPLICATION NO. : 09/994477
DATED : March 28, 2006
INVENTOR(S) : Pedram Abrari and Mark J.F. Allen It is certified that error appears in the above-identified patent and that said Letters Patent is hereby corrected as shown below:

Column 23, line 3, delete "claim 9" and replace with --claim 21--;
                line 6, delete "claim 9" and replace with --claim 21--;
                line 9, delete "claim 9" and replace with --claim 21--.

Signed and Sealed this

Twenty-fourth Day of October, 2006

JON W. DUDAS
*Director of the United States Patent and Trademark Office*

US 7,020,869 C1

(12) EX PARTE REEXAMINATION CERTIFICATE (7246th)
United States Patent
Abrari et al.

(10) Number: US 7,020,869 C1
(45) Certificate Issued: Dec. 15, 2009

(54) BUSINESS RULES USER INTERFACE FOR DEVELOPMENT OF ADAPTABLE ENTERPRISE APPLICATIONS

(75) Inventors: Pedram Abrari, Redwood City, CA (US); Mark J. F. Allen, Menlo Park, CA (US)

(73) Assignee: Corticon Technologies, Inc., San Mateo, CA (US)

Reexamination Request:
No. 90/010,324, Feb. 13, 2009

Reexamination Certificate for:
Patent No.: 7,020,869
Issued: Mar. 28, 2006
Appl. No.: 09/994,477
Filed: Nov. 26, 2001

Certificate of Correction issued Oct. 24, 2006.

Related U.S. Application Data

(60) Provisional application No. 60/250,869, filed on Dec. 1, 2000.

(51) Int. Cl.
*G06F 9/44* (2006.01)

(52) U.S. Cl. .......................... 717/108; 717/116; 706/47
(58) Field of Classification Search ........................ None
See application file for complete search history.

(56) References Cited

FOREIGN PATENT DOCUMENTS

EP          0525258 A      2/1993

*Primary Examiner*—William H. Wood

(57) ABSTRACT

Methods and apparatus, including computer program products, for interacting with a user to define business rules in a declarative manner. The invention operates to display a rule set as an editable list of conditions and an editable list of actions, the conditions and actions being linked to each other by the combination of an editable list of if-values and an editable list of then-values, wherein if-values and then-values are explicitly linked to each other, conditions and if-values are explicitly linked to each other, and then-values and actions are explicitly linked to each other in the displayed lists.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1, 9, 11, 21, 22, 24, 25, 37, 42 and 43 are cancelled.

Claims 2–8, 10, 12–20, 23, 26–36, 38–41 and 44–49 were not reexamined.

\* \* \* \* \*